US011647042B2

(12) United States Patent
Sullivan et al.

(10) Patent No.: US 11,647,042 B2
(45) Date of Patent: May 9, 2023

(54) SYSTEMS AND METHODS FOR PROTECTING AGAINST RELAY ATTACKS

(71) Applicant: Visa International Service Association, San Francisco, CA (US)

(72) Inventors: Brian Sullivan, Amersham (GB); Quan Wang, Foster City, CA (US); Yuexi Chen, Foster City, CA (US); Christian Aabye, Redwood City, CA (US); Christian Flurscheim, Concord, CA (US); Pasan Hapuarachchi, San Anselmo, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 277 days.

(21) Appl. No.: 16/766,250

(22) PCT Filed: Nov. 28, 2018

(86) PCT No.: PCT/US2018/062759
§ 371 (c)(1),
(2) Date: May 21, 2020

(87) PCT Pub. No.: WO2019/108595
PCT Pub. Date: Jun. 6, 2019

(65) Prior Publication Data
US 2021/0126939 A1    Apr. 29, 2021

Related U.S. Application Data

(60) Provisional application No. 62/591,708, filed on Nov. 28, 2017.

(51) Int. Cl.
*H04L 9/40*    (2022.01)
*H04W 4/80*    (2018.01)
(Continued)

(52) U.S. Cl.
CPC ........ *H04L 63/1441* (2013.01); *G07F 15/001* (2013.01); *H04L 9/0825* (2013.01);
(Continued)

(58) Field of Classification Search
CPC . H04L 63/1441; H04L 9/0825; H04L 9/3236; H04L 9/3247; H04L 9/3263;
(Continued)

(56) References Cited

U.S. PATENT DOCUMENTS 9,800,610 B1    10/2017 Lu
10,674,365 B1 *  6/2020 Kamkar .............. H04W 12/082
(Continued)

FOREIGN PATENT DOCUMENTS

CN    102724180    10/2012
CN    105518687    4/2016
(Continued)

OTHER PUBLICATIONS

Application No. EP18883060.8, Extended European Search Report, dated Oct. 13, 2020, 11 pages.
(Continued)

*Primary Examiner* — Brian F Shaw
(74) *Attorney, Agent, or Firm* — Kilpatrick Townsend & Stockton LLP

(57) ABSTRACT

Systems, methods, and devices are disclosed for preventing relay attacks. A user device may receive (e.g., when proximate to the first access device), from an intervening device, device identification data for a first access device. A message may be received from a second access device via the intervening device. The message may include a digital signature generated based at least in part on second access device identification data. The user device may validate the message utilizing the digital signature and a public key. If the message is invalid, the user device may discard the
(Continued)

message. If the message is valid, (e.g., unaltered), the user device may determine that the user has not confirmed an intent to interact with the second access device and may terminate an further interaction with the second access device accordingly.

20 Claims, 12 Drawing Sheets

(51) Int. Cl.
| | | |
|---|---|---|
| *G07F 15/00* | (2006.01) | |
| *H04L 9/08* | (2006.01) | |
| *H04L 9/32* | (2006.01) | |
| *H04W 12/122* | (2021.01) | |
| *G06Q 20/20* | (2012.01) | |
| *G06Q 20/32* | (2012.01) | |
| *G06Q 20/38* | (2012.01) | |
| *G06Q 20/40* | (2012.01) | |
| *G06Q 20/42* | (2012.01) | |

(52) U.S. Cl.
CPC .......... *H04L 9/3236* (2013.01); *H04L 9/3247* (2013.01); *H04L 9/3263* (2013.01); *H04W 4/80* (2018.02); *G06Q 20/204* (2013.01); *G06Q 20/3224* (2013.01); *G06Q 20/3227* (2013.01); *G06Q 20/3278* (2013.01); *G06Q 20/3823* (2013.01); *G06Q 20/40145* (2013.01); *G06Q 20/42* (2013.01); *H04L 2209/56* (2013.01); *H04W 12/122* (2021.01)

(58) Field of Classification Search
CPC ... H04L 63/123; H04L 63/102; H04L 9/0643; H04L 9/005; H04L 2209/56; H04L 67/75; H04W 4/80; H04W 12/122; G07F 15/001; G06Q 20/204; G06Q 20/3224; G06Q 20/3227; G06Q 20/3278; G06Q 20/3823; G06Q 20/40; G06Q 20/3825; G06Q 20/388; G06Q 20/40145; G06Q 20/42

USPC .......................................................... 726/22
See application file for complete search history.

(56) References Cited

U.S. PATENT DOCUMENTS

| | | | |
|---|---|---|---|
| 2004/0221158 A1* | 11/2004 | Olkin .................... | H04L 9/3247 713/170 |
| 2006/0012479 A1* | 1/2006 | Ezra ........................ | G06Q 20/20 705/16 |
| 2008/0195868 A1 | 8/2008 | Asokan et al. | |
| 2013/0291100 A1 | 10/2013 | Ganapathy et al. | |
| 2016/0140539 A1* | 5/2016 | Ma ........................ | G06Q 20/204 705/73 |
| 2016/0143075 A1* | 5/2016 | Tucker .............. | H04M 15/8061 370/329 |
| 2016/0218881 A1 | 7/2016 | Adams | |
| 2017/0006048 A1 | 1/2017 | Garrett et al. | |
| 2017/0255938 A1 | 9/2017 | Biegun et al. | |
| 2018/0218356 A1* | 8/2018 | Grassadonia ........ | G06Q 20/322 |

FOREIGN PATENT DOCUMENTS

| | | |
|---|---|---|
| CN | 107040513 | 8/2017 |
| EP | 3146747 | 3/2017 |
| JP | 2008515315 | 5/2008 |
| JP | 2008199620 | 8/2008 |
| JP | 2014106593 | 6/2014 |
| JP | 2016521029 | 7/2016 |
| JP | 2017085368 | 5/2017 |

OTHER PUBLICATIONS

PCT/US2018/062759 , "International Search Report and Written Opinion", dated Mar. 7, 2019, 9 pages.
Application No. CN201880076718.5 , Notice of Decision to Grant, dated Jan. 26, 2022, 7 pages.
Application No. JP2020-529163 , Office Action, dated Jul. 15, 2022, 4 pages.

* cited by examiner

SYSTEMS AND METHODS FOR PROTECTING AGAINST RELAY ATTACKS

The present application is a 371 National Phase of PCT Patent Application No. PCT/US2018/062759 filed on Nov. 28, 2018, which claims priority to U.S. Provisional Application No. 62/591,708, filed on Nov. 28, 2017, the disclosures of which is are incorporated herein by reference in its their entirety for all purposes.

BACKGROUND

Relay attacks are possible in contact and contactless access transactions, such as payment transactions between a contactless device and a contactless terminal. For example, an attacker (e.g., one or more people working together to steal information or defraud legitimate users) can use two wireless enabled mobile devices, and two mobile applications on the wireless enabled mobile devices to conduct a relay attack. In a typical relay attack, the attacker uses a first mobile device with a first mobile application to tap and communicate with a contactless device in the victim's pocket. The attacker can use a second mobile device with a second mobile application, to tap and communicate with a contactless terminal at, for example, a merchant or other resource provider.

Command messages issued by the contactless terminal are relayed from the second mobile device to the first mobile device, and are then received by the victim's contactless device. The victim's contactless device then responds to the command messages. Access information on the device (e.g., payment information such as a primary account number (PAN)) can then be relayed from the first mobile device to the second mobile device, and then to the contactless terminal. By performing such a relay attack, the attacker can conduct an access transaction (e.g., a purchase transaction) using the victim's contactless device without taking victim's device from his/her possession. Although this particular example is one which involves a merchant, it is understood that this problem can exist in other situations where access to a resource is desired (e.g., an attempt to access a building, or an attempt to access data inside of a computer).

Mobile transactions that use Bluetooth Low Energy (BLE) to communicate between the contactless device and the contactless terminal typically occur with a close proximity between the device and the terminal. However, these transactions are still susceptible to relay attacks.

The embodiments described herein solve these problems, both individually and collectively.

BRIEF SUMMARY

One embodiment of the disclosure is directed to a method. The method may comprise receiving, by a user device from an intervening device, first access device identification data for a first access device. The method may further comprise receiving, by the user device that is proximate to the first access device, a message from a second access device via the intervening device. In some embodiments, the message may comprise message data including at least second access device identification data and a digital signature that is created by signing a hash of the at least second access device identification data with a private key of a public/private key pair associated with the second access device. The method may further comprise obtaining the hash from the digital signature using a public key. The method may further comprise generating an additional hash of the message data. The method may further comprise comparing, by the user device, the hash to the additional hash. The method may further comprise determining, by the user device, if the hash matches the additional hash. The method may further comprise, when the hash does not match the additional hash, automatically terminating, by the user device, any further interaction with the second access device. The method may further comprise, when the hash matches the additional hash: determining that a user of the user device has not confirmed an intent to interact with the second access device, and terminating any further interaction with the second access device based at least in part on determining that the user has not confirmed an intent to interact with the second access device.

Another embodiment of the disclosure is directed to a user device. In some embodiments, the user device may comprise a processor and a non-transitory computer readable medium. In some embodiments, the computer readable medium may comprise code, executable by the processor, for implementing any of the methods described herein.

Another embodiment of the disclosure is directed to a system. The system may include at least one user device and at least one access device. In some embodiments, the user device and/or the access device may comprise a processor and a non-transitory computer readable medium. In some embodiments, the computer readable medium may comprise code, executable by the processor(s), for implementing any of the methods described herein.

DETAILED DESCRIPTION

Figure 1:
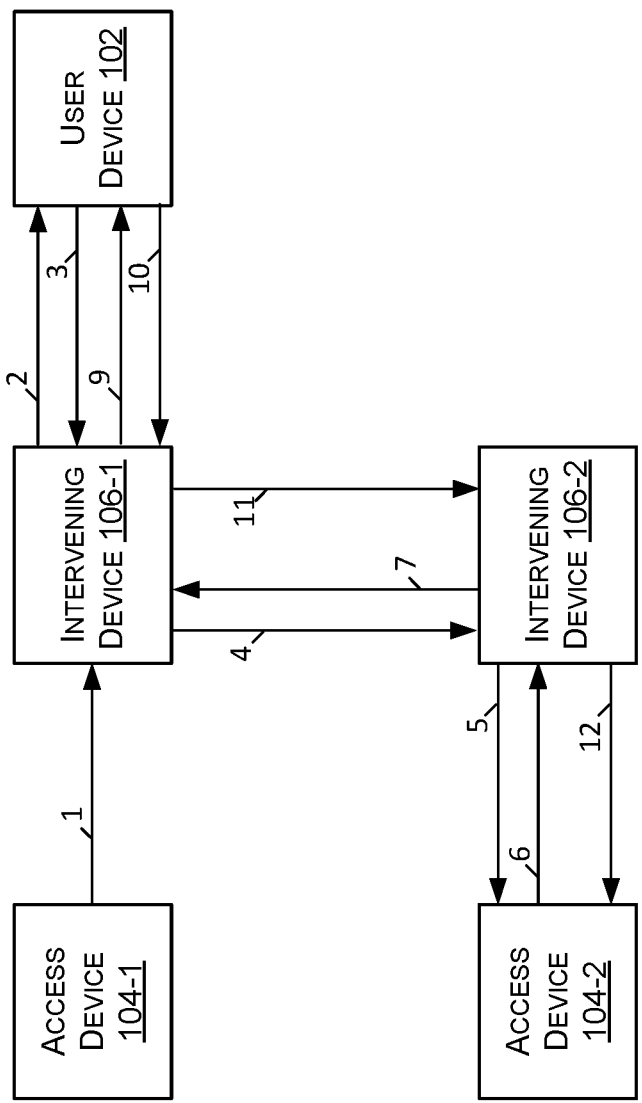
FIG. 1 is a block diagram illustrating an exemplary relay attack, according to some embodiments.

Bluetooth Low Energy (BLE) is a communications technology that is available in most modern smart phones. BLE technology has been leveraged for mobile payments. A feature of BLE that potentially makes it attractive for low friction interactions is that establishing a connection between devices (such as an access device and a user's phone) is easy. For example, when connecting one device to another, there is no need to exchange a PIN or passphrase, as is the case for traditional Bluetooth.

However, the widespread availability of BLE capabilities in user devices, together with the simplicity of establishing a BLE connection between user devices and access devices, unfortunately harbors the desire for fraudsters to develop mobile applications that can mimic a BLE access device. Without protections at the application protocol level, it is possible for a fraudster to perform a relay attack. For example, a fraudster could mimic an access device with which a user device is attempting to interact, and could convince the user of the user device to connect to the fraudulent device instead of the access device. Instead of communicating to the local authentic access device, the fraudster could establish an extended communication channel to an accomplice at a remote access device, and together the fraudsters' devices could manipulate the communications protocol to cause the user to unintentionally interact with a remote access device rather than the access device the user intends.

Prior to discussing specific embodiments of the invention, some terms may be described in detail.

A "user device" may comprise any suitable electronic device that may be transported and operated by a user, which may also provide remote communication capabilities to a network. Examples of remote communication capabilities include using a mobile phone (wireless) network, Bluetooth®, Bluetooth Low Energy® (BLE), wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, etc. Further examples of user devices include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single user device).

"Interaction data" may include any suitable information associated with an interaction between an access device and a user device. Interaction data may include any suitable data associated with an interaction (e.g., a BLE advertisement message, a purchase and/or pre-authorization transaction, etc.). In some embodiments, interaction data may include any suitable combination of: identification data associated with an access device (e.g., one or more identifiers of an access device), identification information associated with a user device (e.g., one or more identifiers associated with a user device), an interaction value (e.g., a transaction amount such as a preauthorization amount and/or purchase price of a transaction), payment data (e.g., a payment account identifier associated with a payment account), one or more locations each associated with an access device and/or a user device, or any suitable information. Examples of payment data may include a PAN (primary account number or "account number"), user name, expiration date, CW (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment data may be any information that identifies or is associated with a payment account. Payment data may be provided in order to make a payment from a payment account. Payment data can also include a user name, an expiration date, a gift card number or code, and any other suitable information.

An "application" may be computer code or other data stored on a computer readable medium (e.g. memory element or secure element) that may be executable by a processor to complete a task.

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a user device, a resource provider computer, a processing network computer, an authorizing entity computer, and/or any other suitable system. An access device may generally be located in any suitable location, such as at the location of a merchant, or at an access location of a building as another example. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user device. In some embodiments, an access device may be configured to communicate with a user device based at least in part on a short-range communications protocol such as Bluetooth® and/or BLE. In some embodiments, an access device may be further configured to utilize any suitable wired and/or wireless network to communication with a resource provider computer, a processing network computer, an authorizing entity computer, and/or any other suitable system. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CW (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

FIG. 1 is a block diagram 100 illustrating an exemplary relay attack, according to some embodiments. The example depicted in FIG. 1 shows how fraudsters may compromise an interaction between a user device 102 and an access device 104-1 using a relay attack. FIG. 1 includes a user device 102, an access device 104-1, an access device 104-2, an intervening device 106-1, and an intervening device 106-2, although any suitable number and/or type of devices may be utilized in other embodiments. As a non-limiting example, the access devices 104-1 and 104-2 may each be situated at separate fuel pump devices (and/or operating as part of a respective fuel pump device) at one or more gas stations.

At step 1, access device 104-1 (e.g., located at gas station "SuperGas" at Pump 1) may transmit an advertisement message (e.g., via a short-range wireless protocol such as BLE). The advertisement message may at least include identification data associated with the access device 104-1. The identification data may be in any form. By way of example, the identification data may include an identifier of a resource provider (e.g., a merchant, such as "SuperGas," "SuperGas at $4^{th}$ and Broadway, Seattle, Wash.", or the like). In some embodiments, the identification data associated with the access device 104-1 may further include a device identifier (e.g., "pump 1"). The user device 102 may approach the access device 104-1 to breach a threshold distance from the access device 104-1 (e.g., within range of receiving short-range wireless messages of the short-range wireless communications protocol such as BLE).

At step 2, an intervening device 106-1, operated by a first fraudster, may intercept the advertisement message and relay the message to the user device 102. In some embodiments, the intervening device 106-1 may alter the advertisement message (e.g., the identification data) prior to relaying the message to the user device 102, while in other embodiments, the intervening device 106-1 may leave the advertisement message unaltered.

Figure 2:
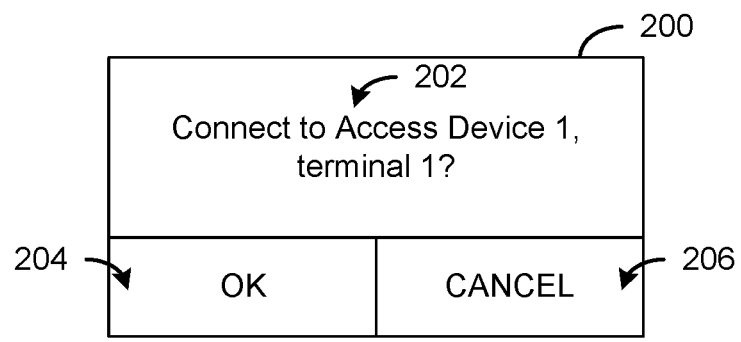
FIG. 2 illustrates an exemplary user interface for establishing a connection to an access device, according to some embodiments.

At step 3, the user device 102 may receive the advertisement message and display one or more user interfaces for confirming a connection with the access device 104-1. By way of example, the user device 102 may present the user interface of FIG. 2. FIG. 2 illustrates an exemplary user interface 200 for establishing a connection to a BLE enabled access device, according to some embodiments. As depicted in FIG. 2, user interface 200 may include text 202. In some embodiments, text 202 may indicate an intent to connect to a particular access device. As a non-limiting example, the text 202 may include some portion of the identification data received at step 3 of FIG. 1. As depicted, the text 202 may indicate that the user intends to establish a connection with access device 1, terminal 1. In the example, provided in FIG. 1, the user interface 200 may include text 202 that indicates that the user intends to establish a connection with "SuperGas, Pump 1." The user interface 200 may include a confirmation button 204 and/or a cancellation button 206. Upon selected the confirmation button 204 (or any suitable user interface element configured to be associated with a confirmation of the intent indicated by text 202), the user device 102 be configured to perform further operations. The specific user interface elements and/or format of the user interface 200 may vary.

Returning to the FIG. 1, upon presenting the user interface 200 and receiving indication that the user has confirmed an intent to establish a connection with "SuperGas, Pump 1," a connection may be established utilizing any suitable short-range wireless protocol (e.g., BLE) between the intervening device 106-1 and the user device 102. Thus, based on relaying the message at step 2, a fraudster may establish a BLE connection between a first fraudulent contactless device (intervening device 106-1) and the user device 102. The user of the user device 102 may believe (e.g., based on the text 202 provided in user interface 200 of FIG. 2) that they are connecting to the access device 104-1. However, the user device 102 may actually be connected to the fraudster's device (e.g., intervening device 106-1).

Once the connection between the intervening device 106-1 and the user device 102 is established, the intervening device 106-1 can connect (or otherwise transmit data), via any suitable wired and/or wireless connection, to an accomplice's second fraudulent device (e.g., intervening device 106-2) at step 4. The intervening device 106-2 can be located at, for example, another access device (e.g., an access device located at another gas station "OtherGas" at "Pump 4"). The intervening device 106-2 may connect (or otherwise transmit data) via a second BLE connection to the access device 104-2 at step 5.

In this fraudulent transaction flow, the intervening device 106-2 may receive interaction data (e.g., including identification information associated with the access device 104-2, an interaction value such as a pre-authorization amount, etc.) from the access device 104-2. The intervening device 106-2 may relay the received interaction data to the intervening device 106-1 at step 7.

Figure 3:
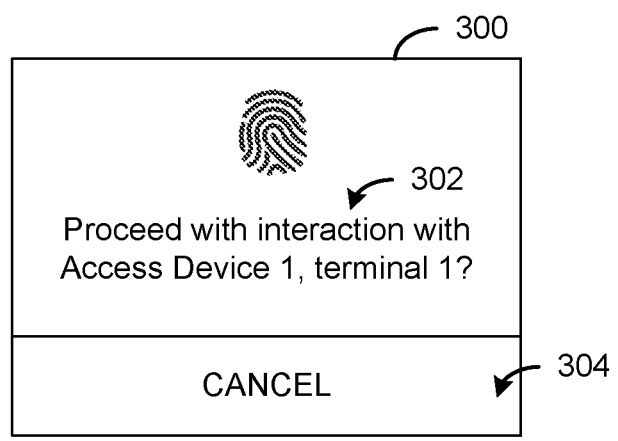
FIG. 3 illustrates an exemplary user interface for confirming an interaction with an access device, according to some embodiments.

In some attacks, the intervening device 106-1 (and/or the intervening device 106-2) may alter the interaction data provided by the access device 104-2. As a non-limiting example, the intervening device 106-1 may alter the identification data to indicate that the interaction data was provided by the access device 104-1 rather than the access device 104-2. More specifically, intervening device 106-1 and/or 106-2 may alter the interaction data associated with "OtherGas, Pump 4" to "SuperGas, Pump 1". This altered interaction data may be relayed to the user device 102 at step 9. Reception of this altered interaction data may cause the user device 102 to present another user interface (e.g., the user interface 300 of FIG. 3) to confirm an interaction between the user device 104 and the intervening device 106-1 purporting to be the access device 104-1. FIG. 3 illustrates an exemplary user interface 300 for confirming an interaction with a BLE enabled access device, according to some embodiments. As a non-limiting example, the user interface 300 may include text 302 which, as depicted in FIG. 3, indicates that the interaction is to be conducted with "Access Device 1, terminal 1." In the ongoing example of FIG. 1, the text 302 may indicate that an interaction is to occur with access device 104-1 (e.g., "Proceed with pre-authorizing $99 at SuperGas, Pump 1). It should be appreciated that the text 302 may include any suitable portion of the interaction data provided by the access device 104-2 and/or altered by the intervening devices 106-1 and/or 106-2.

In some embodiments, the user interface 300 may be configured to receive biometric information utilizing any suitable biometric input device of the user device 102. By way of example, the user may indicate an intent to perform the interaction (e.g., a pre-authorization) by scanning his fingerprint via a fingerprint reader at the user device 102. Any suitable mechanism for indicating an intent to perform the interaction may be utilized (e.g., via a similar a button similar to the confirmation button 204 of FIG. 2, via another suitable biometric input device (e.g., a camera, a retina reader, and iris scanner, etc.). In some embodiments, the user interface 300 may further include cancellation button 304, or a similar interface element, for indicating that the user does not intend to perform the interaction indicated in text 302.

Returning to the ongoing example of FIG. 1, since intervening device 106-1 has previously presented itself as "SuperGas, Pump 1" to the user device 102, the user may be fooled into thinking that his user device 102 is interacting with the access device 104-1 (e.g., the "SuperGas" pump located near the user device 102) to perform the transaction, when in fact it is actually interacting with the access device 104-2 (the "OtherGas" pump) via intervening devices 106-1 and 106-2. As a result, the user may indicate his intent to perform the interaction based on reading the text 302 of FIG. 3 thinking the interaction is with SuperGas, Pump 1, when in fact the user device 102 is not interacting with access device 104-1 at all.

Upon receiving an indication that the user intends to perform the interaction, the user device 102 may be configured to provide payment data at step 10. For example, an application operating on the user device 102 may generate chip data, which is relayed via intervening device 106-1 to intervening device 106-2 at step 11. At step 12, the intervening device 106-2 provides the payment data to the access device 104-2.

This may enable the fraudsters accomplice (e.g., operating intervening device 106-2) to fill their own gas tank, potentially for a much larger amount than the real user intended. In a simple relay attack situation, the real user may not even get a chance to fill their own tank. That is, intervening device 106-1 could simply terminate the BLE connection with the user device 102 as soon as it has the data necessary to perform the fraudulent transaction.

It can be appreciated that there are many variations to this type of attack. The above description is only one example. It can also be appreciated that the provider of access device 104-1 (e.g., a merchant "SuperGas") is not in collusion with the fraudster. As far as the provider of the access device 104-2 (e.g., a merchant "OtherGas") is concerned, the intervening device 106-2 appears to be the device of a genuine user. As a result, the provider of the access device 104-2 is also unknowingly made a party to the fraudulent transaction.

The relay attack described above is possible because there is no check that the access device with which the user believes they are interacting is the same as the access device with which the actual interaction is being performed.

Figure 4:
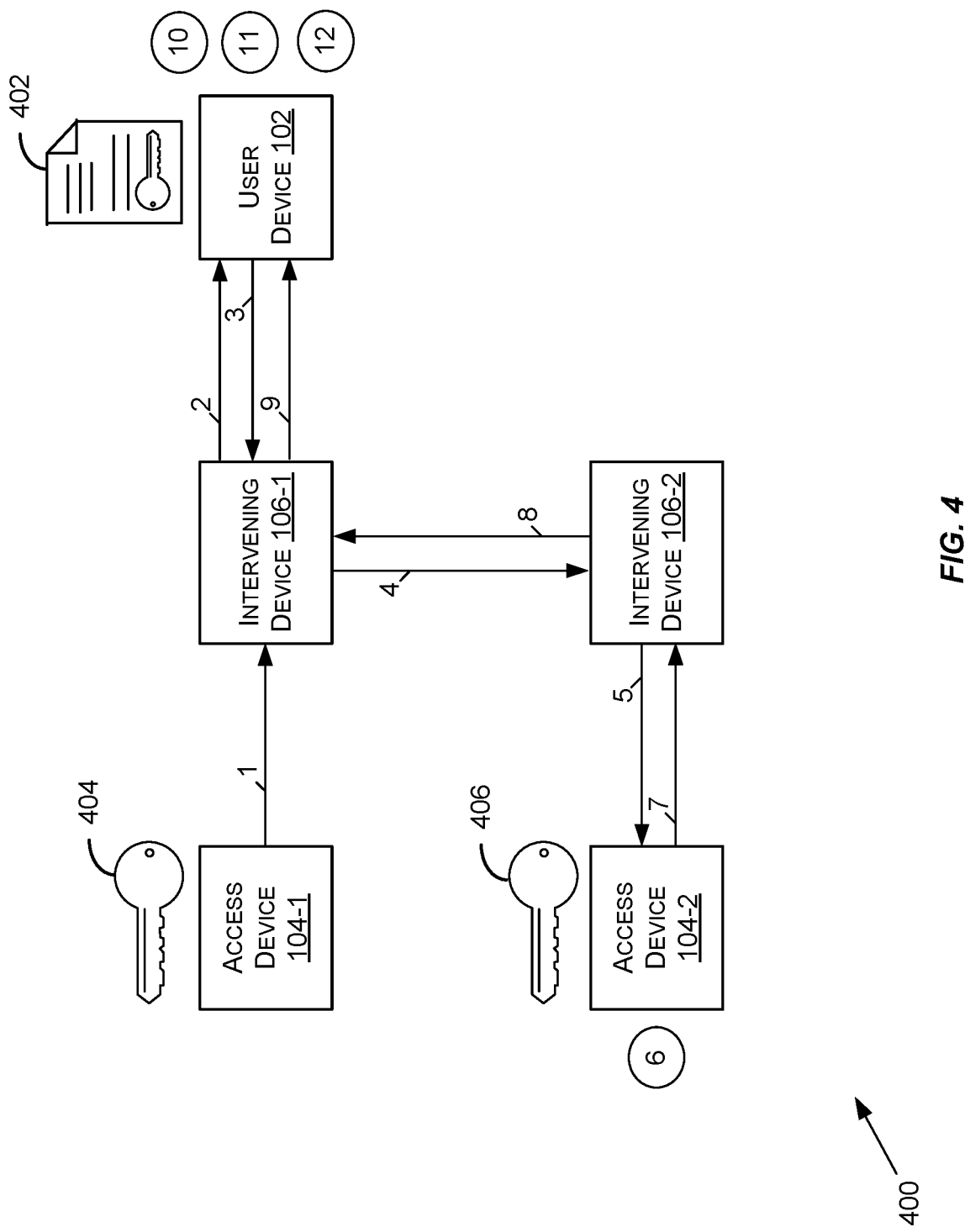
FIG. 4 shows a block diagram illustrating an exemplary method for preventing a relay attack, according to some embodiments.

FIG. 4 shows a block diagram illustrating an exemplary method 400 for preventing a relay attack, according to some embodiments. FIG. 4 illustrates a use case in which an access device (e.g., access device 104-2) digitally signs transmitted data utilizing a private key. The transmission may include the corresponding public key such that, if an intervening device modifies the data, the user device 102 may identify the fact that the data has been modified by validating the digital signature using the public key.

In the example depicted in FIG. 4, the user device 102 may be configured with encryption data 402. In some embodiments, the encryption data 402 may include a certificate issued by a certificate authority (not depicted). In some embodiments, the certificate can be a Europay, Mastercard® and Visa® (EMV) certificate. In some embodiments, the certificate may include a public key associated with the user device 102 as digitally signed by the certificate authority utilizing a private key associated with the certificate authority. The encryption data 402 may further include a private key (e.g., a private key associated with the certified public key that is digitally signed by the certificate authority) that is associated with the user device 104. The access devices 104-1 and 104-2 may each be configured to generate encryption data 404 and 406, respectively. Each of encryption data 404 and 406 may include an uncertified public/private key pair for each respective device. The public/private key pairs may be asymmetric key pairs such as Rivest, Shamir, and Adelman (RSA) keys, Elliptic-curve cryptography (ECC) keys, or keys for some other suitable cryptographic algorithm. In some embodiments, the access devices 104-1 and 104-2 may be configured to generate a new public/private key pair for each potential interaction with a user device (e.g., the user device 102). In other embodiments, the access devices 104-1 and 104-2 may be configured to reuse a respective single public/private key pair to perform various interactions with a variety of user devices.

At step 1, access device 104-1 (e.g., located at gas station "SuperGas" at Pump 1) may transmit an advertisement message (e.g., via a short-range wireless protocol such as BLE). The advertisement message may at least include identification data associated with the access device 104-1. By way of example, the identification data may include an identifier of a resource provider (e.g., a merchant, such as "SuperGas"). In some embodiments, the identification information associated with the access device 104-1 may further include a device identifier (e.g., "pump 1"). The user device 102 may approach the access device 104-1 to breach a threshold distance from the access device 104-1 (e.g., within range of receiving short-range wireless messages of the short-range wireless communications protocol).

At step 2, an intervening device 106-1, operated by a first fraudster, may intercept the advertisement message and relay the message to the user device 102 unaltered.

At step 3, the user device 102 may receive the advertisement message and display one or more user interfaces for confirming a connection with the access device 104-1. By way of example, the user device 102 may present the user interface of FIG. 2.

Returning to the FIG. 1, upon presenting the user interface 200 and receiving confirmation (e.g., an indication that confirmation button 204 was selected) that the user intends to establish a connection with "SuperGas, Pump 1," a connection may be established utilizing any suitable short-range wireless protocol (e.g., BLE) between the intervening device 106-1 and the user device 102. The user of the user device 102 may believe (e.g., based on the text 202 provided in user interface 200 of FIG. 2) that they are connecting to the access device 104-1. However, the user device 102 may actually be connected to the fraudster's device (e.g., intervening device 106-1).

Once the connection between the intervening device 106-1 and the user device 102 is established, the intervening device 106-1 may connect (or otherwise transmit data), via any suitable wired and/or wireless connection, to an accomplice's second fraudulent device (e.g., intervening device 106-2) at step 4. The intervening device 106-2 can be located at, for example, another access device (e.g., an access device located at another gas station "OtherGas"). The intervening device 106-2 may connect (or otherwise transmit data) via a second BLE connection to the access device 104-2 at step 5.

Figure 5:
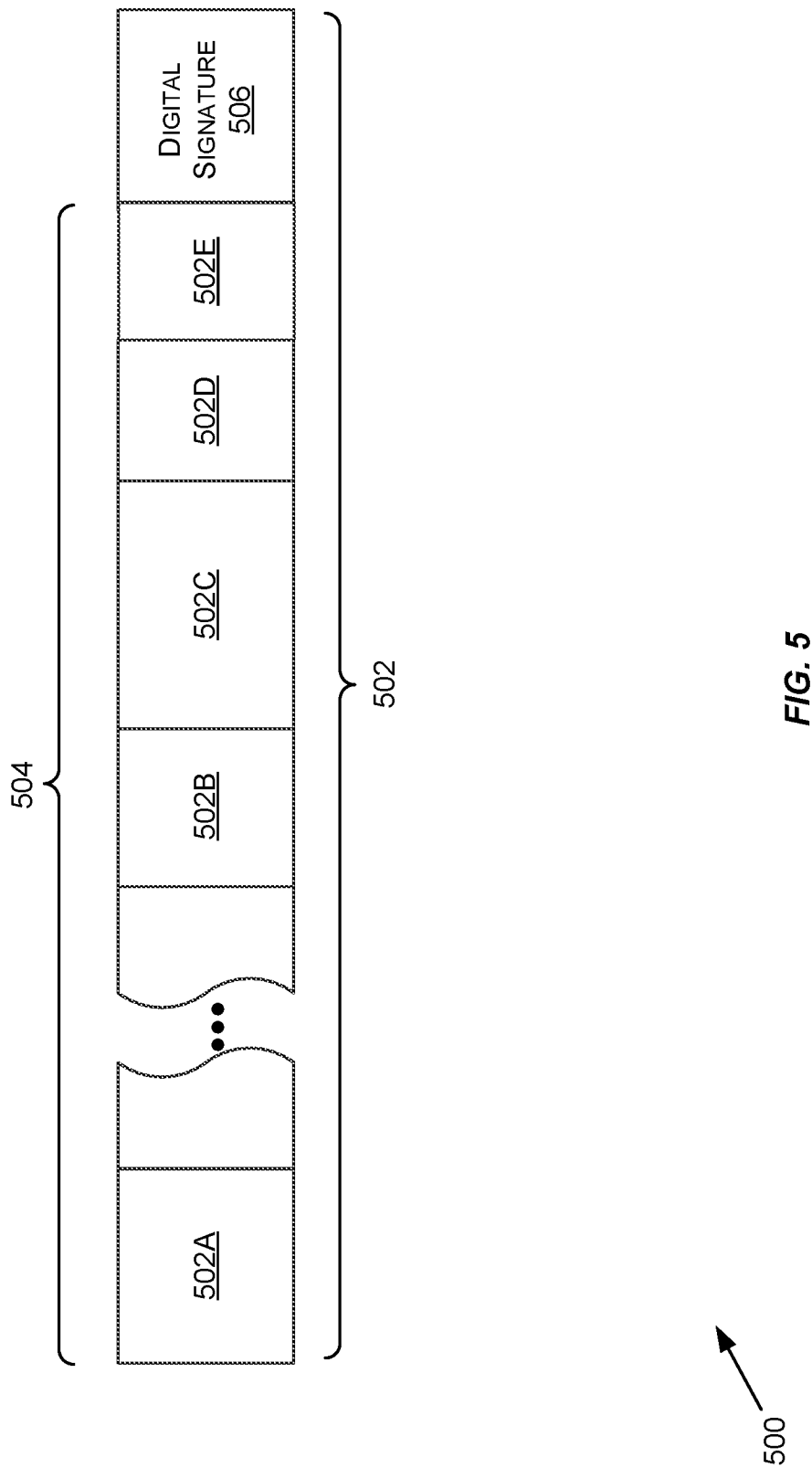
FIG. 5 shows a schematic diagram illustrating an exemplary method for generating a digital signature, according to some embodiments.

In some embodiments, the access device 104-2 may generate interaction data (e.g., including identification information associated with the access device 104-2, an interaction value such as a pre-authorization amount, etc.) for transmission. However, before transmitting the interaction data, the access device 104-2 may be configured to generate a digital signature utilizing at least a portion of the interaction data. FIG. 5 shows a schematic diagram 500 illustrating an exemplary method for generating a digital signature, according to some embodiments.

Schematic diagram 500 depicts message data 502. Message data 502 may include any suitable number of data fields corresponding to any suitable combination of data for establishing a connection and/or performing an interaction between an access device and/or a user device. By way of example, the message data 502 may include a data field 502A. In some embodiments, data field 502A may include an identifier associated with a provider of an access device (e.g., a merchant, such as "SuperGas" of the example of FIG. 4). Message data 502 may additionally, or alternatively, include data field 502B. In some embodiments, data field 502B may include a device identifier (e.g., a serial number, an identifier associated with a particular device of the provider (e.g., "Pump 4" of the example of FIG. 4). In some embodiments, the message data 502 may additionally, or alternatively, include data field 502C. In some embodiments, data field 502C may correspond to an interaction amount (e.g., a pre-authorization amount, a final purchase price, etc.). In some embodiments, the message data 502 may additionally, or alternatively, include data field 502D. In some embodiments, data field 502D may correspond to a location (e.g., a location associated with an access device). In some embodiments, the message data 502 may additionally, or alternatively, include data field 502E. In some embodiments, data field 502E may correspond to a public key (e.g., a public key associated with an access device). Any suitable combination of data fields 504 may be utilized (e.g., by an access device) to generate digital signature 506. It should be appreciated that the order of the message data 502 may differ between embodiments. Although not depicted, in some embodiments (e.g., for messages transmitted from a user device to an access device) data fields may further include a data field for transmitting payment data.

In some embodiments, the digital signature 506 may be generated (e.g., by an access device) by hashing any suitable portion of the data fields 504. By way of example, the digital signature 506 may be generated by first providing data fields 502A and/or 502B as input into a hashing algorithm to produce a hash value. The produced hash value may then be input, along with a private key (e.g., a private key associated with the access device) to a signing algorithm to produce digital signature 506. Digital signature 506 may be utilized, along with the public key corresponding to the private key, to verify that any data fields that were utilized to produce the digital signature have not been altered. As a non-limiting example, a receiver of the message data 502, may utilize a public key (e.g., the public key provided in data field 502E) to retrieve a hash value from the digital signature 506. The receiver may then produce a hash from a predetermined combination of the data fields 504 (e.g., the data fields 502A and 502B) to generate an additional hash value. The receiver may then compare the hash retrieved from the digital signature 506 to the generated hash. If the two hash values match, the receiver is assured that the message is valid (e.g., unaltered). If the two hash value do not match, the receiver may determine that the message is invalid (e.g., has been altered since original transmission). It should be appreciated that the example provided in FIG. 5 is illustrative and not intended to limit the scope of this disclosure. In other embodiments, any suitable combination of the data fields 504 (e.g., all of the data fields 504, more or fewer data fields than already described above, etc.) may be utilized to generate the digital signature 506, which in turn may be utilized to determine whether or not such data has been altered on receipt.

Returning to FIG. 4, the access device 104-2 may generate a digital signature at step 6 utilizing at least a portion of the interaction data. By way of example, the access device 104-2 may utilize identification data (e.g., a merchant identifier, a device identifier, etc.) of the interaction data to generate a digital signature in the manner described in FIG. 5. In some embodiments, the digital signature may be generated using other interaction data (e.g., location, interaction value, etc.) in addition to the identification data. The access device 104-2 may insert the digital signature, and the public key corresponding to the private key utilized to generate the digital signature, within a message and transmit the message to the user device 102.

The intervening device 106-2 may receive the message from the access device 104-2 at step 7 and relay the message to the intervening device 106-1 at step 8.

The intervening device 106-1 (and/or the intervening device 106-2) may alter the interaction data provided by the access device 104-2. As a non-limiting example, the intervening device 106-1 may alter the identification data to indicate that the interaction data was provided by the access device 104-1 rather than the access device 104-2. More specifically, intervening device 106-1 and/or 106-2 may alter the interaction data associated with "OtherGas, Pump 4" to "SuperGas, Pump 1". This altered interaction data may be relayed to the user device 102 at step 9.

At step 10, the user device 102 may be configured to validate the received message utilizing the digital signature and the public key associated with the access device 104-2 that was received within the message. By way of example, the public key included in the received message may be utilized to extract a hash value of the digital signature included in the message. The user device 102 may then calculate an additional hash value based on a predetermined set of data fields (e.g., the data fields 502A and 502B of FIG. 5). The user device 102 may compare the extracted hash value to the calculated hash value.

At step 11, since the hash value don't match due to the data being changed, the user device 102 may be configured to determine that the message is invalid (e.g., altered, or at least the predetermined set of data fields were altered) and terminate any further interaction with access device 104-2.

Figure 6:
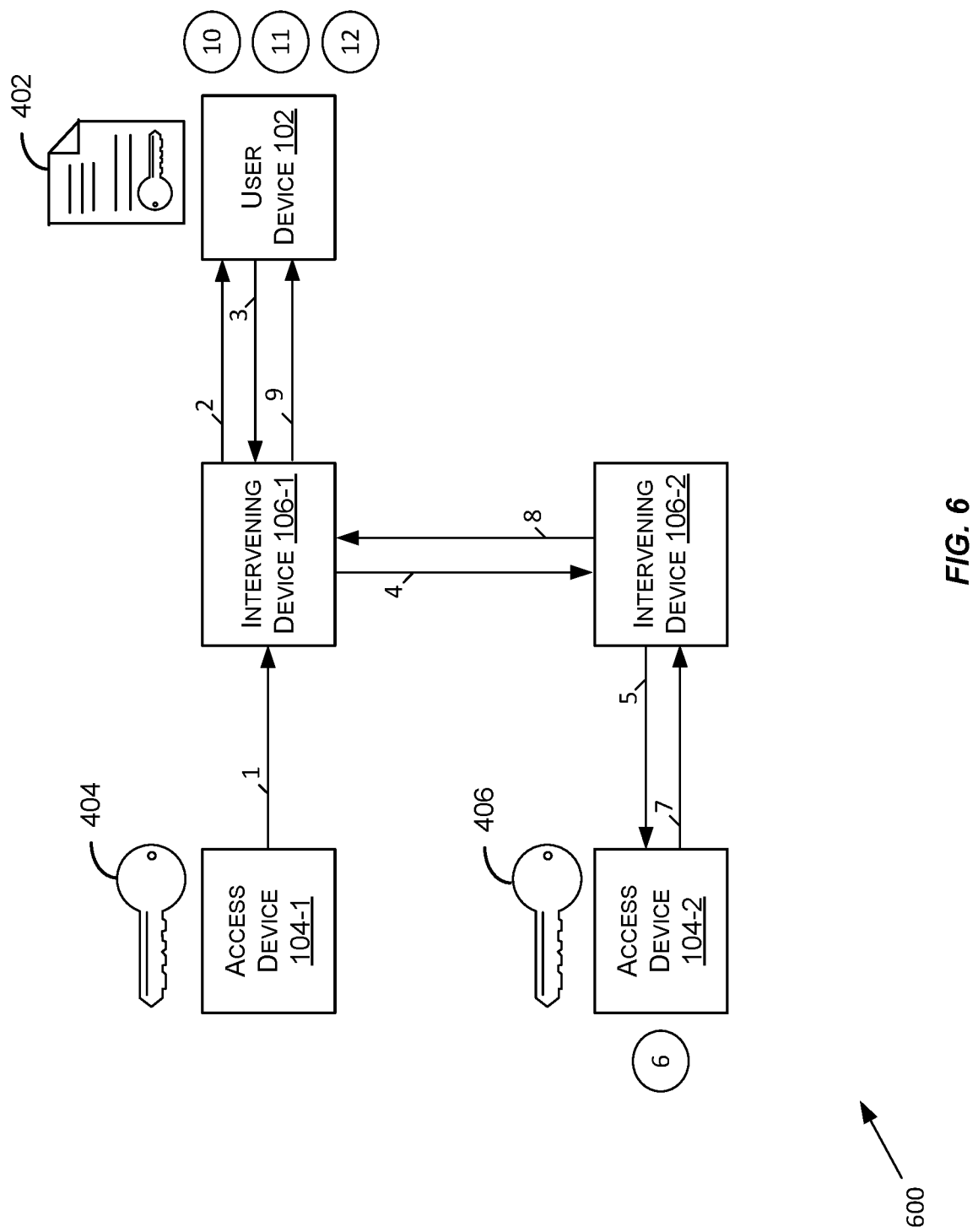
FIG. 6 shows a block diagram illustrating another exemplary method for preventing a relay attack, according to some embodiments.

FIG. 6 shows a block diagram illustrating another exemplary method 600 for preventing a relay attack, according to some embodiments. FIG. 6 illustrates a use case in which an access device (e.g., the access device 104-2) digitally signs data utilizing its private key prior to transmission. The public key corresponding to the private key may be included in the transmission. If the data is not modified by an intervening device but is merely relayed, the validation of the digital signature may pass validation at the user device 102. However, even though the message may be determined to be valid (e.g., unaltered) an additional check of at least some of the data of the message (e.g., identification data indicating a merchant name/identifier for example) may be performed. By way of example, the identification data of the message coming from the access device 104-2 may be compared to the identification received at the initial connection stage to ensure that the entity interacting with the user device is the same entity with which the user device 102 believes a connection was approved.

In the example depicted in FIG. 6, as in the example of FIG. 4, the user device 102 may be configured with encryption data 402. As discussed above with respect to FIG. 4, the encryption data 402 may include a certificate issued by a certificate authority (not depicted). The access devices 104-1 and 104-2 may each be configured to generate encryption data 404 and 406, respectively, which individually may include an uncertified public/private key pair for each respective device.

Steps 1-10 of method 600 may be the performed in a similar manner of steps 1-10 of method 400 as described above in connection with FIG. 4.

At step 1, access device 104-1 (e.g., located at gas station "SuperGas" at Pump 1) may transmit an advertisement message (e.g., via a short-range wireless protocol such as BLE). The advertisement message may at least include identification data associated with the access device 104-1. By way of example, the identification data may include an identifier of a resource provider (e.g., a merchant, such as "SuperGas"). In some embodiments, the identification data associated with the access device 104-1 may further include a device identifier (e.g., "pump 1"). The user device 102 may approach the access device 104-1 to breach a threshold distance from the access device 104-1 (e.g., within range of receiving short-range wireless messages of the short-range wireless communications protocol).

At step 2, an intervening device 106-1, operated by a first fraudster, may intercept the advertisement message and relay the message to the user device 102 unaltered.

At step 3, the user device 102 may receive the advertisement message and display one or more user interfaces for confirming a connection with the access device 104-1. By way of example, the user device 102 may present the user interface of FIG. 2.

Upon presenting the user interface 200 and receiving confirmation (e.g., an indication that confirmation button 204 was selected) that the user intends to establish a connection with "SuperGas, Pump 1," a connection may be established utilizing any suitable short-range wireless protocol (e.g., BLE) between the intervening device 106-1 and the user device 102. The user of the user device 102 may believe (e.g., based on the text 202 provided in user interface 200 of FIG. 2) that they are connecting to the access device 104-1. However, the user device 102 may actually be connected to the fraudsters device (e.g., intervening device 106-1). The user device 102, in this embodiment, may store at least a portion of the data received in the advertisement message. By way of example, the user device 102 may store identification data (e.g., "SuperGas") as being indicative of the device to which the user device 102 is purportedly connected.

Once the connection between the intervening device 106-1 and the user device 102 is established, the intervening device 106-1 may connect (or otherwise transmit data), via any suitable wired and/or wireless connection, to an accomplice's second fraudulent device (e.g., intervening device 106-2) at step 4. The intervening device 106-2 can be located at, for example, another access device (e.g., an access device located at another gas station "OtherGas"). The intervening device 106-2 may connect (or otherwise transmit data) via a second BLE connection to the access device 104-2 at step 5.

In some embodiments, the access device 104-2 may generate interaction data (e.g., including identification information associated with the access device 104-2, an interaction value such as a pre-authorization amount, etc.) for transmission. However, before transmitting the interaction data, the access device 104-2 may be configured to generate a digital signature utilizing at least a portion of the interaction data in the manner discussed above in connection with FIGS. 4 and 5.

At step 6, the access device 104-2 may generate a digital signature utilizing at least a portion of the interaction data. By way of example, the access device 104-2 may utilize identification data (e.g., a merchant identifier, a device identifier, any suitable combination of the data fields 504 of FIG. 5, etc.) of the interaction data to generate a digital signature in the manner described in FIG. 5. The access device 104-2 may insert the digital signature, and the public key corresponding to the private key utilized to generate the digital signature, within a message and transmit the message to the user device 102.

The intervening device 106-2 may receive the message from the access device 104-2 at step 7 and relay the message to the intervening device 106-1 at step 8. The intervening device 106-1 (and/or the intervening device 106-2) may relay the unaltered message the user device 102 at step 9. It should be appreciated that in the ongoing example, the message still indicates identification data corresponding to "OtherGas."

At step 10, the user device 102 may be configured to validate the received message utilizing the digital signature and the public key associated with the access device 104-2 that was received within the message. By way of example, the public key included in the received message may be utilized to extract a hash value of the digital signature included in the message. The user device 102 may then calculate an additional hash value based on a predetermined set of data fields (e.g., the data field 502A and 502B of FIG. 5). The user device 102 may compare the extracted hash value to the calculated hash value.

At step 11, since the hash values may match due to the message data being unaltered, the user device 102 may be configured to determine that the message is valid (e.g., unaltered, or at least the predetermined set of data fields were not altered).

At step 12, the user device may be further configured to determine whether some portion of the data fields match stored information. By way of example, the user device 102 may determine whether the identification data received in the message (e.g., indicating "OtherGas") matches the identification data stored at the user device 102 and associated with the access device 104-1 (e.g., "SuperGas") with which the user device 102 is supposedly connected. In the ongoing example, the user device 102 may determine that the received identification data (e.g., "OtherGas") does not match the stored identification data associated with the connection device (e.g., "SuperGas"). Based at least in part on this determination, the user device 102 may be configured to terminate any further interaction with access device 104-2.

Figure 7:
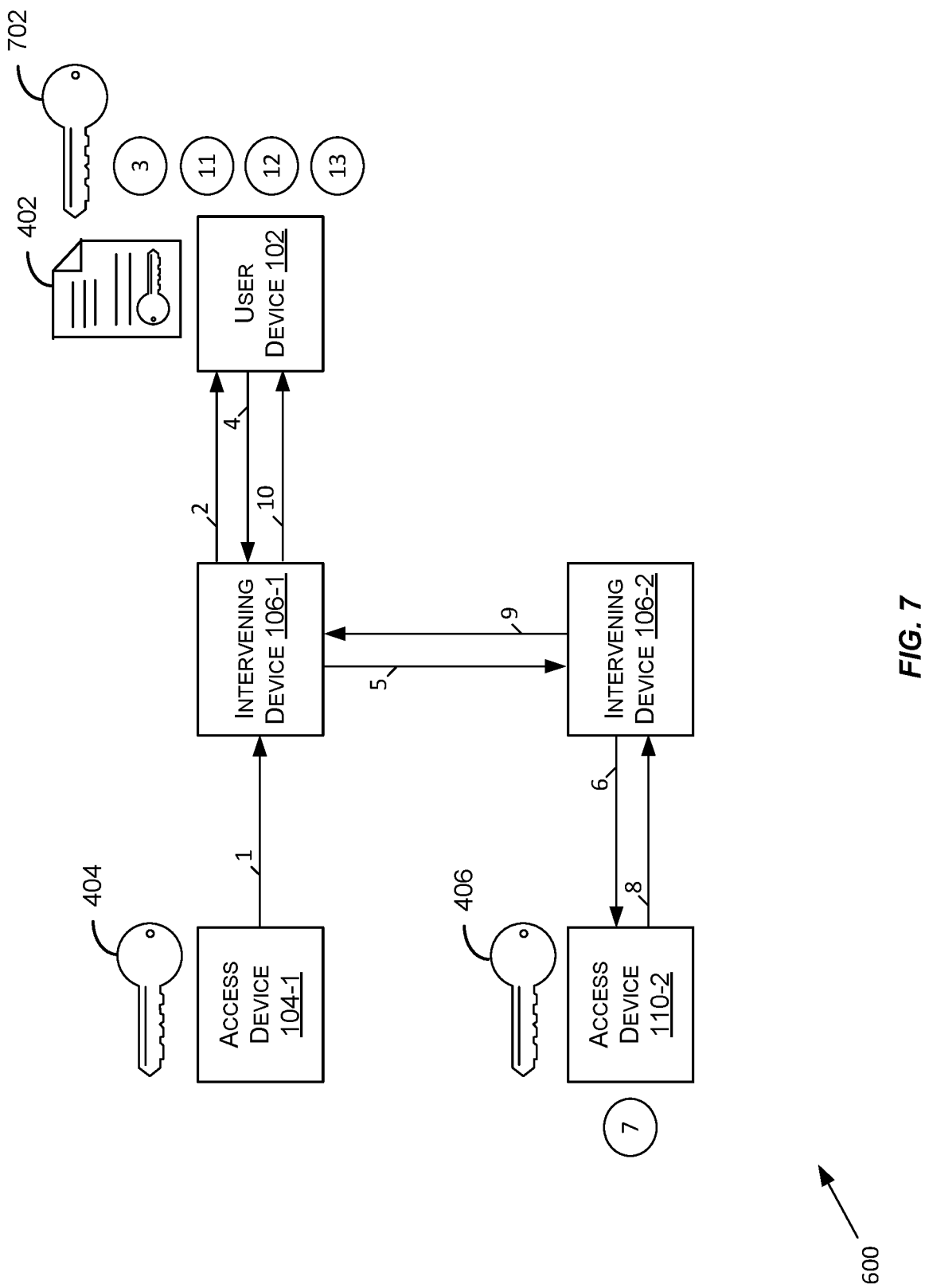
FIG. 7 shows a block diagram illustrating yet another exemplary method for preventing a relay attack, according to some embodiments.

FIG. 7 shows a block diagram illustrating yet another exemplary method 700 for preventing a relay attack, according to some embodiments. FIG. 7 is directed to an example in which the access device 104-1 provides its public key in a connection message transmitted to user device 102. That same public key may be used to validate a subsequent message from the access device 104-2. In a relay attack, the public key of the connecting device would not match the public key of the subsequent message, this may cause a validation check of the subsequent message to fail at the user device 102.

In the example depicted in FIG. 7, as described above in connection with FIGS. 4 and 6, the user device 102 may be configured with encryption data 402 (e.g., a certificate and/or a certified public/private key pair). The access devices 104-1 and 104-2 may each be configured to generate and/or store encryption data 404 and 406, respectively. Each of encryption data 404 and 406 may include an uncertified public/private key pair for each respective device. By way of example, encryption data 404 may include public key 702 and a private key associated with the public key 702.

At step 1, access device 104-1 (e.g., located at gas station "SuperGas" at Pump 1) may transmit an advertisement message (e.g., via a short-range wireless protocol such as BLE). The advertisement message may at least include identification data associated with the access device 104-1. By way of example, the identification data may include an identifier of a resource provider (e.g., a merchant, such as "SuperGas"). In some embodiments, the identification data associated with the access device 104-1 may further include a device identifier (e.g., "pump 1"). In the example provided in FIG. 7, the advertisement message may further include the public key 702 of encryption data 404. The user device 102 may approach the access device 104-1 to breach a threshold distance from the access device 104-1 (e.g., within range of receiving short-range wireless messages of the short-range wireless communications protocol).

At step 2, an intervening device 106-1, operated by a first fraudster, may intercept the advertisement message and relay the message to the user device 102 unaltered.

At step 3, the user device 102 may receive the advertisement message and display one or more user interfaces for confirming a connection with the access device 104-1. By way of example, the user device 102 may present the user interface 200 of FIG. 2. In some embodiments, the user device 102 may store the public key 702 of the encryption data 404 at the user device 102.

Upon presenting the user interface 200 and receiving confirmation (e.g., an indication that confirmation button 204 of FIG. 2 was selected) that the user intends to establish a connection with "SuperGas, Pump 1," the user device 102 may establish a connection utilizing any suitable short-range wireless protocol (e.g., BLE) with the intervening device 106-1 at step 4. The user of the user device 102 may believe (e.g., based on the text 202 provided in user interface 200 of FIG. 2) that they are connecting to the access device 104-1. However, the user device 102 may actually be connected to the fraudster's device (e.g., intervening device 106-1).

Once the connection between the intervening device 106-1 and the user device 102 is established, the intervening device 106-1 may connect (or otherwise transmit data), via any suitable wired and/or wireless connection, to an accomplice's second fraudulent device (e.g., intervening device 106-2) at step 5. The intervening device 106-2 can be located at, for example, another access device (e.g., an access device located at another gas station "OtherGas"). The intervening device 106-2 may connect (or otherwise transmit data) via a second BLE connection to the access device 104-2 at step 6.

In some embodiments, the access device 104-2 may generate interaction data (e.g., including identification data associated with the access device 104-2, an interaction value such as a pre-authorization amount, etc.) for transmission. However, before transmitting the interaction data, the access device 104-2 may be configured to generate a digital signature utilizing at least a portion of the interaction data as described above in connection with FIGS. 4-7. The access device 104-2 may generate a digital signature at step 7 utilizing at least a portion of the interaction data. By way of example, the access device 104-2 may utilize any suitable portion of the interaction data (e.g., a merchant identifier and/or a device identifier, a merchant identifier/device identifier/and a location associated with the access device, or any suitable combination of the data fields 504 of FIG. 5) to generate a digital signature in the manner above. The access device 104-2 may insert the digital signature within a message and transmit the message to the user device 102. In some embodiments, the access device 104-2 may (or may not) insert the public key utilized to generate the digital signature within the same message prior to transmitting the message to the user device 102.

The intervening device 106-2 may receive the message from the access device 104-2 at step 8 and relay the message to the intervening device 106-1 at step 9. The intervening device 106-1 may forward the message, unaltered or altered, to the user device 102 at step 10. In some embodiments, the intervening devices 106-1 and/or 106-2 may alter some portion of the message, while in other embodiments, the intervening devices 106-1 and 106-2 simply relay the message unaltered to the user device 102.

At step 11, the user device 102 may be configured to validate the received message utilizing the digital signature and the public key 702. By way of example, the public key 702 received at connection may be utilized to extract a hash value of the digital signature included in the message received at step 10. The user device 102 may then calculate an additional hash value based on a predetermined set of data fields (e.g., the data fields 502A and 502B, the data fields 502A, 502B, and 502D, or any suitable combination of the data fields 504 of FIG. 5). The user device 102 may compare the extracted hash value to the calculated hash value.

At step 12, since the hash values do not match (e.g., based at least in part on the public key 702 being utilized to validate the message and that the public key 702 does not correspond to the private key used to generate the digital signature) the user device 102 may determine that the message is invalid. This determination may occur regardless of whether the message was altered or unaltered. In some embodiments, in addition, or as an alternative to validation utilizing the digital signature, the user device 102 may be configured to compare the public key 702 to the public key included in the message received at step 10. If the public keys do not match, the user device 102 may be configured to determine the message is invalid without necessarily validating the message utilizing the digital signature and hash values as described above.

At step 13, in response to determining that the message is invalid, the user device 102 may terminate any further interaction with the access device 104-2.

Figure 8:
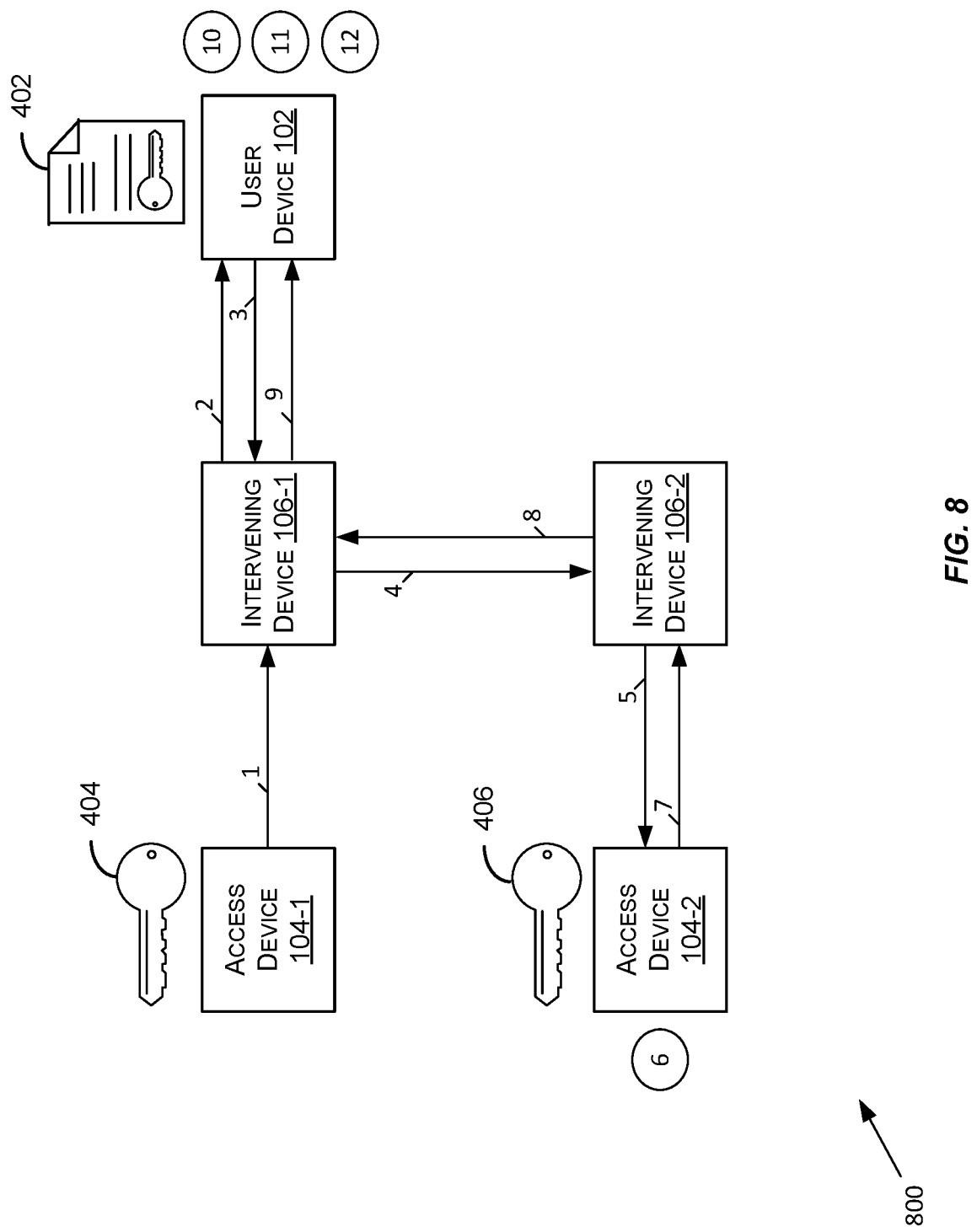
FIG. 8 shows a block diagram illustrating yet another exemplary method for preventing a relay attack, according to some embodiments.

FIG. 8 shows a block diagram illustrating yet another exemplary method for preventing a relay attack, according to some embodiments. FIG. 8 is directed to an example in which two intervening device merely relay messages between access devices and a user device. Because the messages are not modified, a validation check of the message may indicate that the message is valid (e.g., unaltered). However, the user may be provided a notification which may enable the user to become aware of a discrepancy between the entity he believed he was connected to and the entity subsequently requesting additional data (e.g., payment data). The user may utilize this notification to proceed with canceling the interaction due to this discrepancy.

In the example depicted in FIG. 8, as described above in connection with FIGS. 4, 6, and 7, the user device 102 may be configured with encryption data 402 (e.g., a certificate and/or a certified public/private key pair). The access devices 104-1 and 104-2 may each be configured to generate and/or store encryption data 404 and 406, respectively. Each of encryption data 404 and 406 may include an uncertified public/private key pair for each respective device.

At step 1, access device 104-1 (e.g., located at gas station "SuperGas" at Pump 1) may transmit an advertisement message (e.g., via a short-range wireless protocol such as BLE). The advertisement message may at least include identification data associated with the access device 104-1. By way of example, the identification data may include an identifier of a resource provider (e.g., a merchant, such as "SuperGas"). In some embodiments, the identification data associated with the access device 104-1 may further include a device identifier (e.g., "pump 1"). The user device 102 may approach the access device 104-1 to breach a threshold distance from the access device 104-1 (e.g., within range of receiving short-range wireless messages of the short-range wireless communications protocol).

At step 2, an intervening device 106-1, operated by a first fraudster, may intercept the advertisement message and relay the message to the user device 102 unaltered.

At step 3, the user device 102 may receive the advertisement message and display one or more user interfaces for confirming a connection with the access device 104-1. By way of example, the user device 102 may present the user interface 200 of FIG. 2.

Returning to the FIG. 8, upon presenting the user interface 200 and receiving confirmation (e.g., an indication that confirmation button 204 of FIG. 2 was selected) that the user intends to establish a connection with "SuperGas, Pump 1," a connection may be established utilizing any suitable short-range wireless protocol (e.g., BLE) between the intervening device 106-1 and the user device 102. The user of the user device 102 may believe (e.g., based on the text 202 provided in user interface 200 of FIG. 2) that they are connecting to the access device 104-1. However, the user device 102 may actually be connected to the fraudster's device (e.g., intervening device 106-1).

Once the connection between the intervening device 106-1 and the user device 102 is established, the intervening device 106-1 may connect (or otherwise transmit data), via any suitable wired and/or wireless connection, to an accomplice's second fraudulent device (e.g., intervening device 106-2) at step 4. The intervening device 106-2 can be located at, for example, another access device (e.g., an access device located at another gas station "OtherGas"). The intervening device 106-2 may connect (or otherwise transmit data) via a second BLE connection to the access device 104-2 at step 5.

In some embodiments, the access device 104-2 may generate interaction data (e.g., including identification information associated with the access device 104-2, an interaction value such as a pre-authorization amount, etc.) for transmission. However, before transmitting the interaction data, the access device 104-2 may be configured to generate a digital signature utilizing at least a portion of the interaction data as described above in connection with FIGS. 4-7. The access device 104-2 may generate a digital signature at step 6 utilizing at least a portion of the interaction data. By way of example, the access device 104-2 may utilize identification data (e.g., a merchant identifier, a device identifier) and (in some cases) a location associated with the access device to generate a digital signature in the manner described in FIG. 5. The access device 104-2 may insert the digital signature, and the public key corresponding to the private key utilized to generate the digital signature, within a message and transmit the message to the user device 102.

The intervening device 106-2 may receive the message from the access device 104-2 at step 7 and relay the message to the intervening device 106-1 at step 8. The intervening device 106-1 may forward the message, unaltered, to the user device 102 at step 9.

At step 10, the user device 102 may be configured to validate the received message utilizing the digital signature and the public key associated with the access device 104-2 that was received within the message. By way of example, the public key included in the received message may be utilized to extract a hash value of the digital signature included in the message. The user device 102 may then calculate an additional hash value based on a predetermined set of data fields (e.g., the data fields 502A and 502B, the data fields 502A, 502B, and 502D, or any suitable combination of the data fields 504 of FIG. 5). The user device 102 may compare the extracted hash value to the calculated hash value.

At step 11, since the hash values match due to the data being unaltered, the user device 102 may be configured to determine that the message is valid (e.g., unaltered, or at least the predetermined set of data fields were unaltered). As a result of this determination, a user interface (e.g., the user interface 300 of FIG. 3) may be presented at the user device 102 to illicit confirmation from the user with respect to an intent to interact with the access device 104-2. It may be the case that because the user was presented with information (e.g., "SuperGas") at connection, he may realize that the data now presented (e.g., "OtherGas") is associated with a different access device (e.g., access device 104-2) than the access device (e.g., access device 104-1) with which he believes he's connected. The user may indicate (e.g., via selection of the cancellation button 304 of FIG. 3) that he does not intend to interact with access device 104-2.

At step 12, although the message was determined to be valid, the user device 102 may terminate any further interaction with the access device 104-2 based at least in part on receiving the indication that the user does not intend to interact with access device 104-2.

Figure 9:
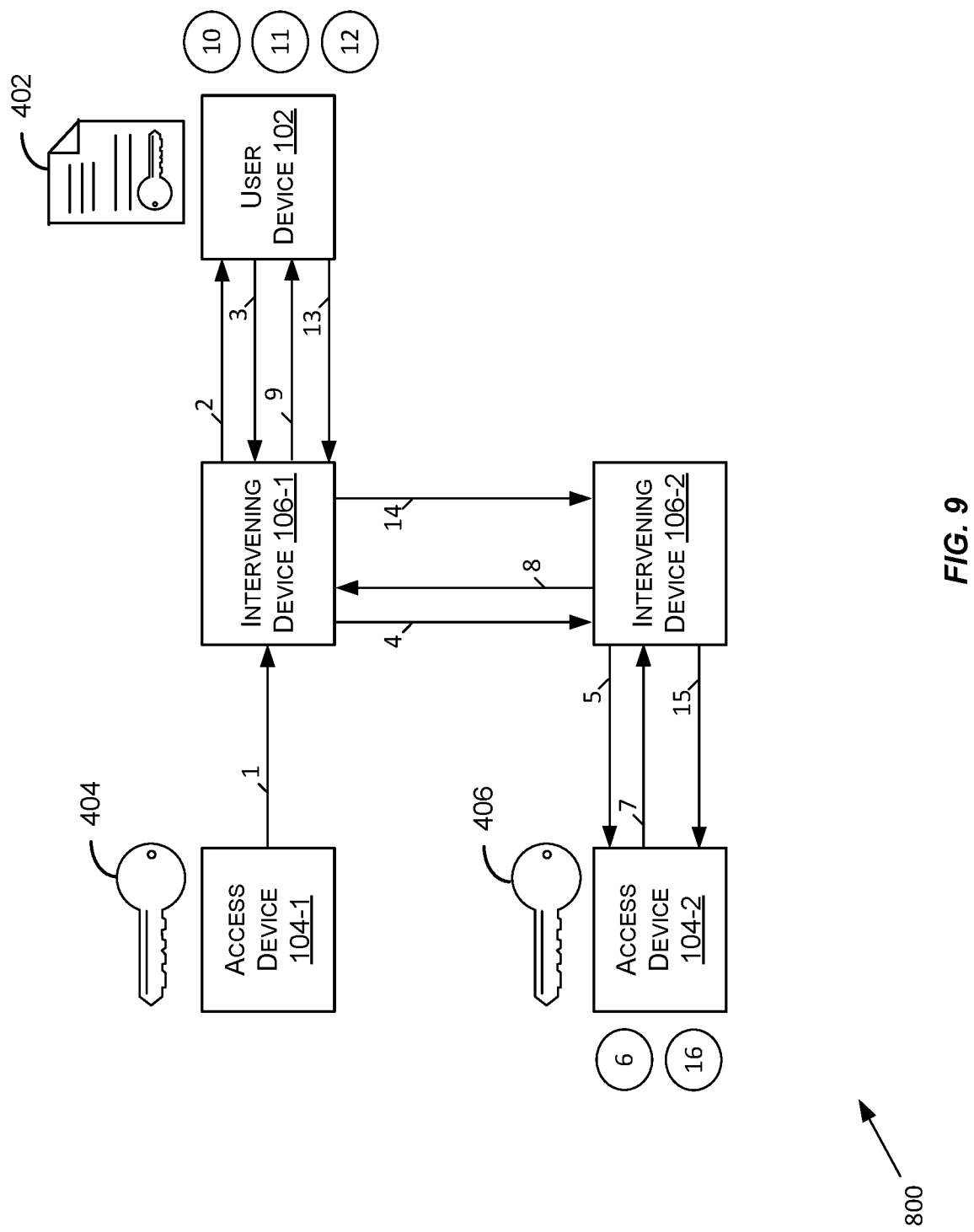
FIG. 9 shows a block diagram illustrating still one further exemplary method for preventing a relay attack, according to some embodiments.

FIG. 9 shows a block diagram illustrating still one further exemplary method 900 for preventing a relay attack, according to some embodiments. FIG. 9 is directed to an example in which a user device (e.g., the user device 102) falsely believes connection has been made with access device 104-1 (e.g., associated with "SuperGas") but mistakenly authorizes a subsequent interaction with access device 104-2 (e.g., "OtherGas") because, despite being provided a notification, the user may not have noticed a discrepancy between the purported connected access device and the access device requesting the subsequent interaction. In this use case, the user device 102 may digitally sign data going back to access device 104-2. Upon receipt, access device 104-2 may check a public key of the message (e.g., the public key of the access device 104-2 previously sent to the user device and then digitally signed by user device). If the public key included in the message is same public key as held by access device 104-2 then interaction may be deemed valid. If valid, at least a portion of the received data may be sent to a resource provider to conduct a traditional authorization request process. If however, the message is invalid, the access device 104-2 may be configured to cease processing.

In the example depicted in FIG. 9, the user device 102 may be configured with encryption data 402. As discussed above with respect to FIG. 4, the encryption data 402 may include a certificate issued by a certificate authority (not depicted). The access devices 104-1 and 104-2 may each be configured to generate encryption data 404 and 406, respectively. Each of encryption data 404 and 406 may include an uncertified public/private key pair for each respective device.

At step 1, access device 104-1 (e.g., located at gas station "SuperGas" at Pump 1) may transmit an advertisement message (e.g., via a short-range wireless protocol such as BLE). The advertisement message may at least include identification data associated with the access device 104-1. By way of example, the identification data may include an identifier of a resource provider (e.g., a merchant, such as "SuperGas"). In some embodiments, the identification data associated with the access device 104-1 may further include a device identifier (e.g., "pump 1"). The user device 102 may approach the access device 104-1 to breach a threshold distance from the access device 104-1 (e.g., within range of receiving short-range wireless messages of the short-range wireless communications protocol).

At step 2, an intervening device 106-1, operated by a first fraudster, may intercept the advertisement message and relay the message to the user device 102 unaltered.

At step 3, the user device 102 may receive the advertisement message and display one or more user interfaces for confirming a connection with the access device 104-1. By way of example, the user device 102 may present the user interface of FIG. 2.

Upon presenting the user interface 200 and receiving confirmation (e.g., an indication that confirmation button 204 was selected) that the user intends to establish a connection with "SuperGas, Pump 1," a connection may be established utilizing any suitable short-range wireless protocol (e.g., BLE) between the intervening device 106-1 and the user device 102. The user of the user device 102 may believe (e.g., based on the text 202 provided in user interface 200 of FIG. 2) that they are connecting to the access device 104-1. However, the user device 102 may actually be connected to the fraudster's device (e.g., intervening device 106-1).

Once the connection between the intervening device 106-1 and the user device 102 is established, the intervening device 106-1 may connect (or otherwise transmit data), via any suitable wired and/or wireless connection, to an accomplice's second fraudulent device (e.g., intervening device 106-2) at step 4. The intervening device 106-2 can be located at, for example, another access device (e.g., an access device located at another gas station "OtherGas"). The intervening device 106-2 may connect (or otherwise transmit data) via a second BLE connection to the access device 104-2 at step 5.

In some embodiments, the access device 104-2 may generate interaction data (e.g., including identification information associated with the access device 104-2, an interaction value such as a pre-authorization amount, etc.) for transmission. However, before transmitting the interaction data, the access device 104-2 may be configured to generate a digital signature utilizing at least a portion of the interaction data in the manner discussed above in connection with FIGS. 4-8.

At step 6, the access device 104-2 may generate a digital signature utilizing at least a portion of the interaction data. By way of example, the access device 104-2 may utilize any suitable portion of the interaction data (e.g., a merchant identifier, a device identifier, any suitable combination of the data fields 504 of FIG. 5, etc.) to generate a digital signature in the manner described above. The access device 104-2 may insert the digital signature, and the public key corresponding to the private key utilized to generate the digital signature, within a message and transmit the message to the user device 102.

The intervening device 106-2 may receive the message from the access device 104-2 at step 7 and relay the message to the intervening device 106-1 at step 8. The intervening device 106-1 (and/or the intervening device 106-2) may relay the unaltered message to the user device 102 at step 9. It should be appreciated that in the ongoing example, the message still indicates identification data corresponding to "OtherGas."

At step 10, the user device 102 may be configured to validate the received message utilizing the digital signature and the public key associated with the access device 104-2 that was received within the message. By way of example, the public key included in the received message may be utilized to extract a hash value of the digital signature included in the message. The user device 102 may then calculate an additional hash value based on a predetermined set of data fields (e.g., the data field 502A and 502B of FIG. 5). The user device 102 may compare the extracted hash value to the calculated hash value.

At step 11, since the hash values may match due to the message data being unaltered, the user device 102 may be configured to determine that the message is valid (e.g., unaltered, or at least the predetermined set of data fields were not altered). One or more user interfaces (e.g., the user interface 300 of FIG. 3 may be provided at the user device. The user may not recognize that the text 302 indicates an interaction with an access device (e.g., the access device 104-2) that differs from the access device (e.g., the access device 104-1) to which the user believes is connected to the user device 102. As a result, the user may confirm the interaction at step 12.

At step 13, in response to receiving an indication that the user confirmed the interaction with access device 104-2, the user device 102 may be configured to provide payment data and the encryption data 402 (e.g., a certificate issued by a certificate authority, not shown). In some embodiments, the payment data included in the message by the user device 102 may be in the form of a token and/or an encrypted value which is decryptable by the receiving access device 104-2. The user device 102 may include some portion of the interaction data originally provided by the access device 104-2 in the message received at step 9. By way example, the user device 102 may include the identification data associated with the access device (e.g., a merchant identifier and/or a device identifier) along with the public key provided in the message received at step 9 and associated with the access device 104-2. In some embodiments, the user device 102 may be configured to generate a digital signature utilizing any suitable message data (e.g., the identification data, the public key associated with the access device 104-2, the payment data, the encryption data 402, or any suitable combination of the above and/or the data fields 5024 of FIG. 5).

The intervening device 106-1 may receive the message from the user device and relay the message to the intervening device 106-2 at step 14. The intervening device 106-2 may in turn relay the message to access device 104-2.

At step 16, the access device 104-2 may be configured to validate the message received utilizing a public key associated with the user device 102. By way of example, a public key associated with the certificate authority that issued the certificate contained in the message received at step 15 may be retrieved from local memory of the access device 104-2. The public key of the certificate authority may be utilized to retrieve the public key associated with the user device 102 from the certificate. The access device 104-2 may be configured to utilize the public key associated with user device 102 to validate the message received at step 15.

By way of example, the access device 104-2 may be configured to utilize the public key associated with the user device 102 to retrieve a hash value from the digital signature of the message received at step 15. The access device 104-2 may then generate an additional hash value utilizing a predetermined hashing algorithm and a predetermined set of data fields of the message received at step 15. By way of example, the additional hash value may be generated by providing the hashing algorithm as input any suitable combination of the identification data of the message, a public key included in the message, and/or the payment data included in the message. Once generated, the resultant hash value may be compared to the hash value retrieved from the digital signature. If the hash values do not match, the access device 104-2 may be configured to terminate the interaction and to perform no further processing of the payment data.

If the hash values match, the access device 104-2 may be configured to proceed as the match may indicate that not only was the message unaltered, but the correct public key associated with the access device 104-2 was utilized (e.g., by the user device 102) to validate the message initially transmitted at step 7. In some embodiments, the access device 104-2 may proceed by generating an authorization request message which may then be transmitted to a resource provider computer (e.g., the resource provider computer 1230 of FIG. 12) as part of an traditional process for authorizing a payment transaction. A flow describing the process for authorizing a payment transaction is discussed in further detail with respect to FIG. 12. If the authorization request is granted, the access device 104-2 may enable access to a good and/or service (e.g., gas managed by the access device 104-2) to the user device 102.

Figure 10:
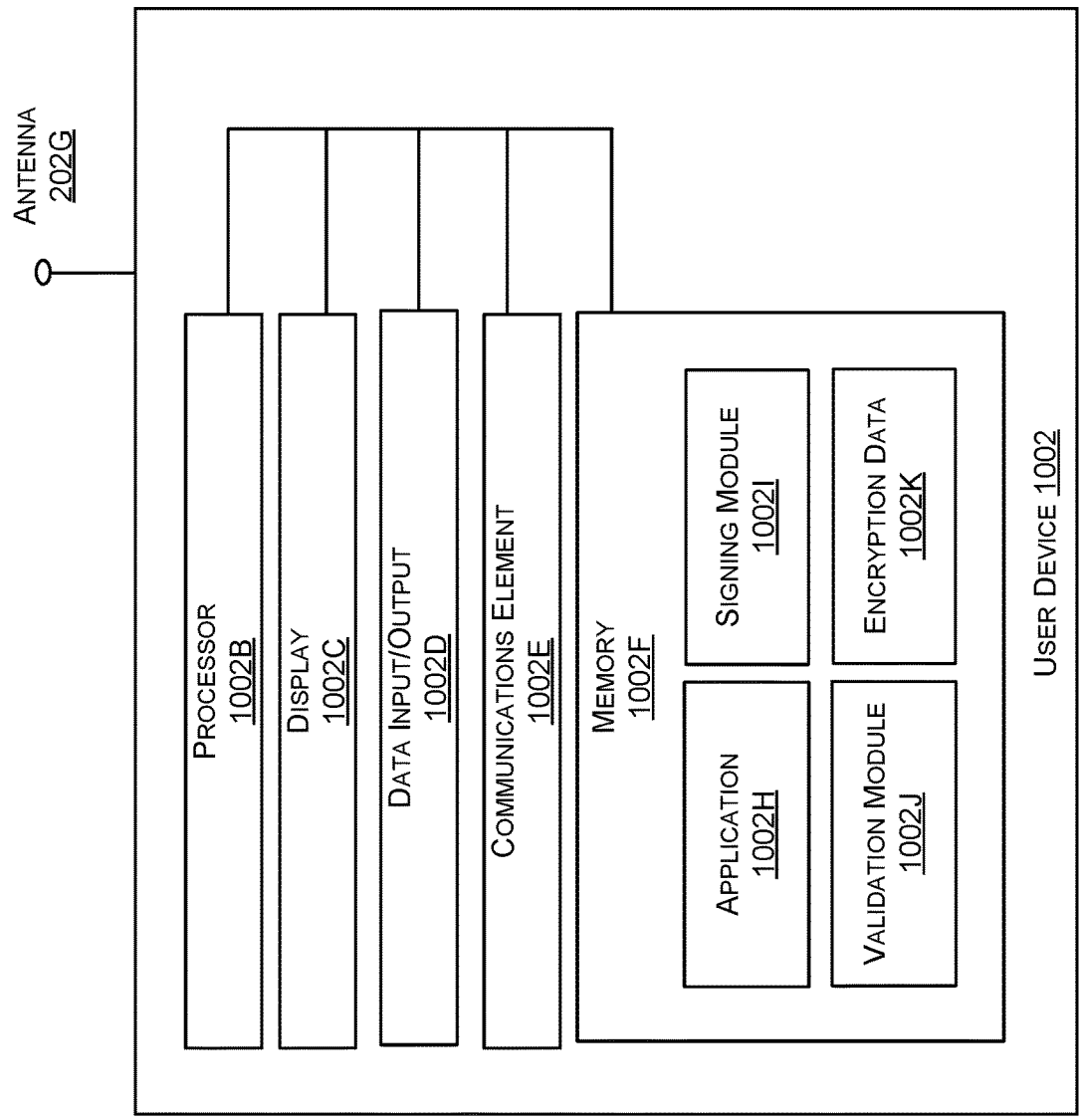
FIG. 10 shows a block diagram of an exemplary user device according to an embodiment of the invention.

The example provided in FIG. 9 illustrates how the disclosed techniques can successfully prevent a relay attack. A successful relay attack could be conducted only if data communicated between the user device 102 and the access device 104-2 is unaltered. In practice, most users would recognize a discrepancy between the merchant at which they are located (e.g., SuperGas) and the merchant for whom they are being asked for consent to pay (e.g., OtherGas). Even if the user inadvertently consents to pay, the signature verification would fail at the access device 104-2, [0121] FIG. 10 shows a block diagram of an exemplary user device 1002 according to an embodiment of the invention. User device 1002 may be an example of user device 102 of FIGS. 1, 4, and 6-9. In some embodiments, user device 1002 may include circuitry that is used to enable certain device functions, such as telephony. The functional elements responsible for enabling those functions may include a processor 1002B that can execute instructions that implement the functions and operations of the device. Processor 1002B may access the memory 1002F (or another suitable data storage region or element) to retrieve instructions or data used in executing the instructions, such as provisioning scripts and mobile applications. Data input/output elements 1002D, such as a keyboard or touchscreen, may be used to enable a user to operate the user device 1002 and input data. Data input/output elements may also be configured to output data (via a speaker of the device, for example). Display 1002C may also be used to output data to a user. Communications element 1002E may be used to enable data transfer between user device 1002 and a wired or wireless network (via antenna 1002G, for example) to assist in connectivity to the Internet or other network, and enabling data transfer functions. In some embodiments, the communication element 1002E may utilize a short-range wireless communications protocol (e.g., BLE).

In some embodiments, user device 1002 may also include contactless element interface to enable data transfer between contactless element (not shown) and other elements of the device, where contactless element may include a secure memory and a near field communications data transfer element (or another form of short range communications technology). A cellular phone or similar device is an example of a user device 1002 that may be used in accordance with embodiments of the present invention. However, other forms or types of devices may be used without departing from the underlying concepts of the invention. For example, the user device 1002 may alternatively be in the form of a payment card, a key fob, a PDA, a tablet computer, a net book, a laptop computer, a smart watch, an automobile with remote capabilities, etc.

The memory 1002F may comprise an application 1002H and/or any other suitable module or data. For example, in some embodiments, the memory 1002F may include signing module 10021, validation module 1002J, and/or encryption data 1002K. The user device 1002 may have any number of mobile applications installed or stored on the memory 1002F and is not limited to that shown in FIG. 10. The memory 1002F may also comprise code, executable by the processor 1002B for implementing the methods discussed herein.

Figure 11:
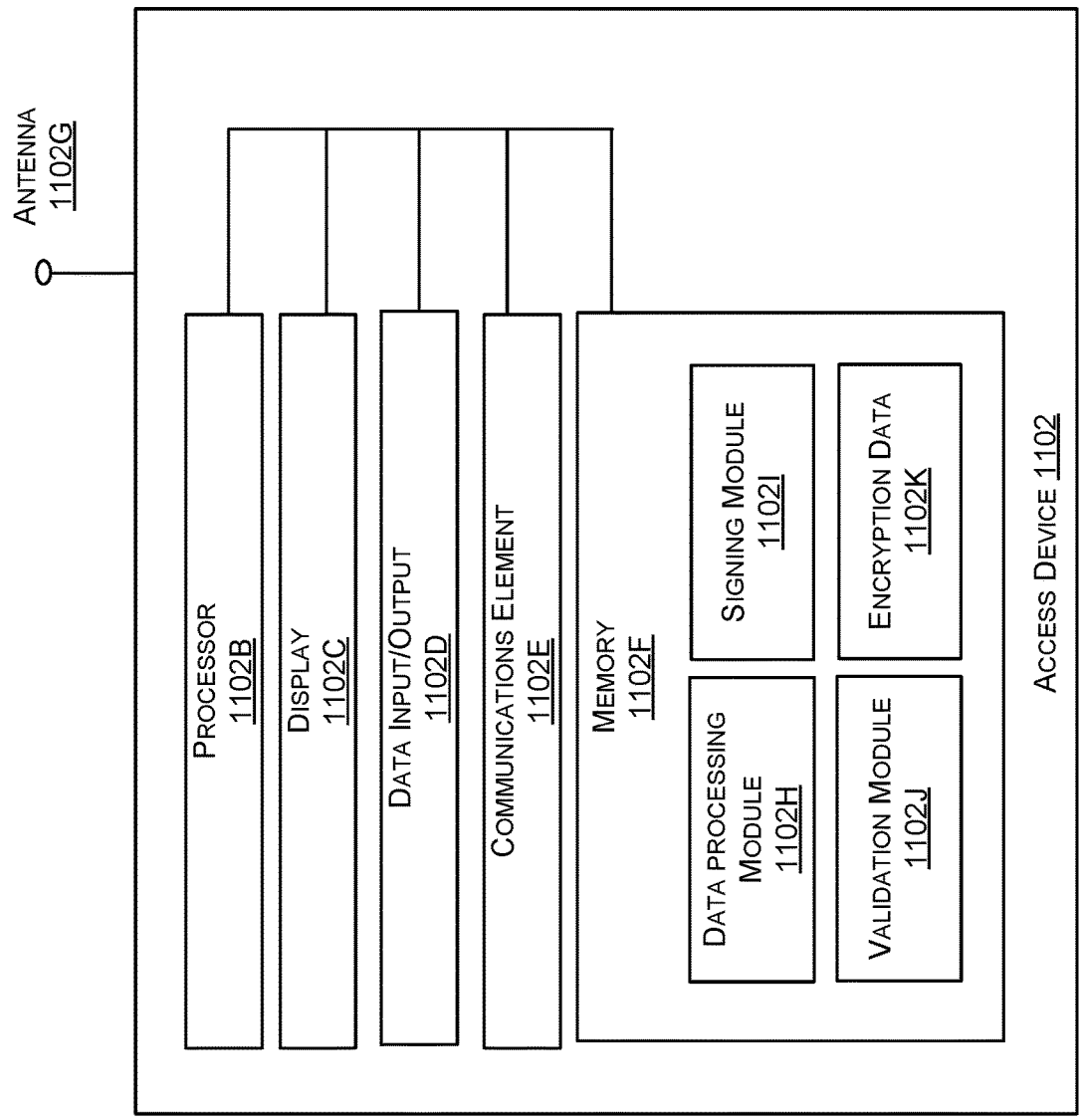
FIG. 11 shows a block diagram of an exemplary access device according to an embodiment of the invention.

The application 1002H may be in any suitable form. By way of example, the application 1002H may be an application that may be utilized to interact with an access device (e.g., the access device 104-1 of FIG. 1, the access device 1102 of FIG. 11, etc.). In some embodiments, the application 1002H may be an application configured to provide any suitable user interfaces (e.g., the user interfaces 200 and 300 of FIGS. 2 and 3, respectively) or any suitable user interface configured to collect data and/or confirm interaction between a user device 1002 and an access device. In some embodiments, the application 1002H may be utilized to perform a transaction for a good and/or a service such as exchanging payment data and/or interaction data (e.g., identification data, interaction value, a public key, location, device information, etc.) with an access device to obtain fuel (or another good and/or service) and/or access to a resource (e.g., as in access to a building as described below with respect to FIG. 13). In some embodiments, the application 1002H (or another suitable module) may be configured to cause the processor 1002B to perform operations and/or present any suitable user interfaces for establishing a connection (e.g., a BLE connection) with one or more other devices (e.g., an access device, an intervening device, etc.). The application 1002H (or another suitable module) may be further configured to cause the processor 1002B to perform operations and/or present any suitable interface for confirming an interaction with one or more other devices (e.g., an access device, an intervening device, etc.).

In some embodiments, the application 1002H may be configured to transmit and/or receive any suitable message to/from an access device and/or an intervening device. In some embodiments, these messages may be transmitted and/or received via a BLE and/or other suitable short-range wireless communications protocol. The application 1002H may be configured to cause the processor 1002B to stimulate the functionality of the signing module 10021 prior to transmission of a message and/or to stimulate the functionality of the validation module 1002J upon receipt of a message.

The signing module 10021 may be configured with code that, when executed by the processor 1002B may cause the processor 1002B to perform any suitable operations for generating a digital signature and transmitting a message that at least includes the digital signature. By way of example, the signing module 10021 may be configured to cause the processor 1002B to hash one or more data fields of message data (e.g., identification data associated with the user device 1002, identification data associated with an access device, one or more locations associated with the user device 1002 and/or the access device, an interaction value, a public key of an access device, a certificate of the user device 1002, and/or the like) to produce a hash value. In some embodiments, the signing module 10021 may be configured to cause the processor 1002B to digitally sign the hash value with a private key associated with the user device 1002. Once generated, the digital signature may be inserted into a message (e.g., along with one or more other data fields such as identification data associated with the user device 1002, identification data associated with an access device, one or more locations associated with the user device 1002 and/or the access device, the interaction value, a public key of an access device, a certificate of the user device 1002, and/or the like) and transmitted to an access device. In some embodiments, the signing module 10021 may operate as part of the application 1002H.

The validation module 1002J may be configured with code that, when executed by the processor 1002B may cause the processor 1002B to perform any suitable operations for validating a message. In some embodiments, the validation module 1002J may be configured to cause the processor 1002B to receive a message including a public key of an access device. The validation module 1002J may, in some embodiments, store the received public key within the memory 1002F for subsequent use. In some embodiments, the validation module 1002J may be configured to cause the processor 1002B to receive a message including a digital signature (e.g., a digital signature generated by an access device utilizing a private key associated with the access device). In some embodiments, the received message may also include a public key associated with an access device. The validation module 1002J may cause the processor 1002B to utilize the public key (e.g., either received in the message including the digital signature or utilizing the stored public key received in a previous message) to validate the received message.

By way of example, the validation module 1002J may be configured to cause the processor 1002B to utilize the stored or received public key to retrieve a hash value from the digital signature. The validation module 1002J may further cause the processor 1002B to hash one or more data fields of the received message (e.g., identification data associated with the user device 1002, identification data associated with an access device, one or more locations associated with the user device 1002 and/or the access device, an interaction value, a public key of an access device, a certificate of the user device 1002, and the like) to produce an additional hash value. In some embodiments, the validation module 1002J may be configured to cause the processor 1002B to compare the hash value retrieved from the digital signature with the calculated hash value. If the hash values match, the validation module 1002J may stimulate the application 1002H (or another suitable module) to perform operations (e.g., transmit a message including at least a portion of the received message data to another device such as a resource provider computer 1230 of FIG. 12).

In some embodiments, if the hash values match, the validation module 1002J may determine that the message is valid (e.g., unaltered). In some embodiments, the validation module 1002J may be configured to cause the processor 1002B to conduct a further determination as to whether a location of the valid message is within a threshold distance of a location associated with the user device 1002. In these examples, the validation module 1002J may retrieve a location associated with the user device 1002 from, for example, a global positioning system component of the 1002 (e.g., an example of the data input/output elements 1002D). In still further embodiments, the validation module 1002J may, upon determining that the message is valid (e.g., based on the comparison of the retrieved hash and the calculated hash), perform additional operations of comparing an stored identifier associated with an access device to which the user device 1002 has supposedly connected, to identification data of the received message that is associated with the transmitting device (e.g., an access device). In some embodiments, the validation module 1002J may terminate an interaction and perform no further processing with a transmitting device if the message is determined to be invalid (e.g., altered, based at least in part on the comparison of the retrieved hash and the calculated hash), and/or the locations are not within a threshold distance of one another, and/or if the stored identifier does not match the identification data included in the received message. In some embodiments, the validation module 1002J may operate as part of the application 1002H.

In some embodiments, the validation module 1002J (e.g., upon determining that the message is valid, and/or the locations are within the predetermined distance of one another, and/or that the stored identifier matches identification data included in the message) may be configured to trigger the application 1002H to present a user interface at the display 1002C to illicit confirmation from the user of the user device 1002 that he desires to interact with the transmitting device (e.g., the access device indicated in the message). Upon receiving an indication of confirmation, the application 1002H may be configured to cause the processor 1002B to execute code associated with the signing module 1002I described above to transmit a message that may include a digital signature generated by the signing module 1002I as described above.

Figure 12:
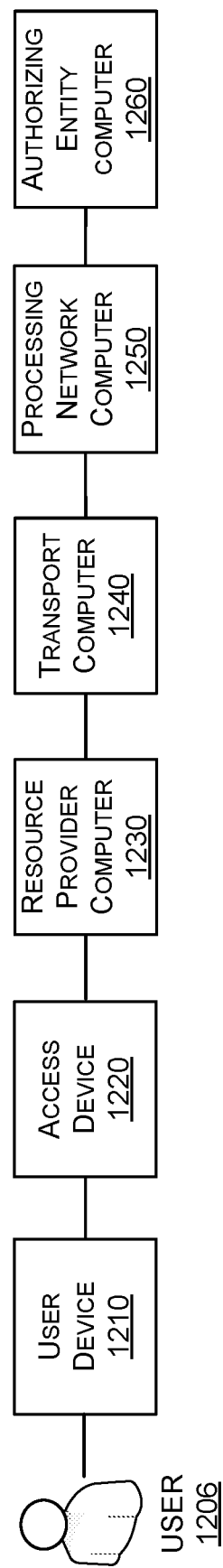
FIG. 12 shows a block diagram illustrating a transaction processing system.

The encryption data 1002K may be in the form of a certificate provided by a certificate authority (e.g., the processing network computer 1250 of FIG. 12 or any suitable certifying authority). The encryption data 1002K may further include a public/private key issued by the certificate authority and provisioned to the user device 1002. The certificate, in some embodiments, may be digitally signed with a private key associated with the certificate authority. A public key of the certificate authority may be distributed to one or more access devices. In some embodiments, the certificate may include a public key associated with the user device 1002 and/or any suitable identification data. The certificate may be digitally signed by the certificate authority such that the public key distributed to an access device may be utilized to retrieve the public key associated with the user device 1002 from the certificate.

An example of an access device 1102 according to an embodiment of the invention, is shown in FIG. 10. Access device 1102 may be an example of the access device 104-1 and/or 104-2 of FIG. 1. In some embodiments, access device 1102 may include circuitry that is used to enable certain device functions, such as telephony. The functional elements responsible for enabling those functions may include a processor 1102B that can execute instructions that implement the functions and operations of the device. Processor 1102B may access the memory 1102F (or another suitable data storage region or element) to retrieve instructions or data used in executing the instructions, such as provisioning scripts and mobile applications. Data input/output elements 1102D, such as a keyboard or touchscreen, may be used to enable a user to operate the access device 1102 and input data. Data input/output elements may also be configured to output data (via a speaker of the device, for example). Display 1102C may also be used to output data to a user. Communications element 1102E may be used to enable data transfer between access device 1102 and a wired or wireless network (via antenna 1102G, for example) to assist in connectivity to the Internet or other network, and enabling data transfer functions. In some embodiments, the communication element 1102E may utilize a short-range wireless communications protocol (e.g., BLE).

In some embodiments, access device 1102 may also include contactless element interface to enable data transfer between contactless element (not shown) and other elements of the device, where contactless element may include a secure memory and a near field communications data transfer element (or another form of short range communications technology). A point of sale terminal is an example of an access device 1102 that may be used in accordance with embodiments of the present disclosure. However, other forms or types of devices may be used without departing from the underlying concepts of the invention.

The memory 1102F may comprise a data processing module 1102H and/or any other suitable module or data. For example, in some embodiments, the memory 1102F may further include signing module 1102I, validation module 1102J, and/or encryption data 1102K. The memory 1102F may also comprise code, executable by the processor 1102B for implementing the methods discussed herein.

The encryption data 1102K may be in the form of a public/private key pair generated by the access device 1102. The public/private key pair may be generated at any suitable time and stored in memory 1102F for subsequent use. In some embodiments, a new public/private key pair may be generated to correspond to a particular interaction with another device (e.g., a user device, an intervening device, etc.) such that a unique public/private key pair may correspond a particular message exchange. In other embodiments, the same public/private key pair may be utilized with any suitable message exchange with any suitable interacting device (e.g., a user device and/or an intervening device).

The data processing module 1102H may be in any suitable form. In some embodiments, the data processing module 1102H may be configured with code that, when executed by the processor 1102B, cause the processor 1102B to send and/or receive messages (e.g., to and/or from a user device and/or an intervening device). In some embodiments, the data processing module 1102H may be configured to transmit messages (e.g., advertisements) indicating at least identification data such as one or more identifiers of the access device 1102. In some embodiments, the data processing module 1102H may be configured to cause the processor 1102B to include a public key associated with the access device 1102 as retrieved from the encryption data 1102K. The data processing module 1102H may include the public key in any suitable message transmission (e.g., an advertisement message, an interaction request message, etc.). In some embodiments, the data processing module 1102H may be configured to stimulate the functionality of the signing module 1102I to generate a digital signature from one or more message data fields of a message to be transmitted. In some embodiments, the data processing module 1102H may be configured to stimulate the functionality of the validation module 1102J based at least in part on receiving a message from a device (e.g., a user device and/or an intervening device).

In general, the data processing module 1102H may be configured to transmit and/or receive any suitable message to/from an access device and/or an intervening device. In some embodiments, these messages may be transmitted and/or received via a BLE and/or other suitable short-range wireless communications protocol. The data processing module 1102H may be further configured to cause the processor 1102B to stimulate any suitable functionality of the signing module 1102I and/or the validation module 1102J to perform the methods discussed herein.

The signing module 1102I may be configured with code that, when executed by the processor 1102B may cause the processor 1102B to perform any suitable operations for generating a digital signature and transmitting a message that at least includes the generated digital signature. By way of example, the signing module 1102I may be configured to cause the processor 1102B to hash one or more data fields of a message (e.g., identification data associated with the access device 1102, a location associated with the access device 1102, an interaction value, a public key of an access device, and/or the like) to produce a hash value. In some embodiments, the signing module 1102I may be configured to cause the processor 1102B to digitally sign the hash value with a private key associated with the access device 1102. Once generated, the digital signature may be inserted into a message (e.g., along with one or more other data fields such as identification information associated with the access device 1102, identification information associated with an access device, a location associated with the access device 1102, transaction information, a public key of an access device 1102, and/or the like) and transmitted to another device (e.g., the user device 102 of FIG. 1, the intervening device 106-1 of FIG. 1, etc.).

The validation module 1102J may be configured with code that, when executed by the processor 1102B may cause the processor 1102B to perform any suitable operations for validating a received message. In some embodiments, the validation module 1102J may be configured to cause the processor 1102B to receive a message including a digital signature purportedly generated by a user device (e.g., utilizing a private key associated with the user device 102). The message may further include a certificate associated with the user device 102 and issued by a certificate authority. In some embodiments, the access device 1102 may store a public key associated with the certificate authority within encryption data 1102K. Upon retrieving, the public key of the certificate authority, the validation module 1102J may be configured to utilize the public key of the certificate authority to retrieve a public key associated with the user device from the received certificate. The validation module 1002J may cause the processor 1002B to utilize the public key associated with the user device and retrieved from the certificate to validate the digital signature of the received message.

By way of example, the validation module 1102J may be configured to cause the processor 1102B to utilize the public key of the user device to retrieve a hash value from the digital signature. The validation module 1102J may further cause the processor 1102B to hash one or more data fields of the received message (e.g., identification information associated with the access device 1102, identification information associated with the user device 102, payment data and/or transaction information, a certificate of the user device 102, and the like) to produce an additional hash value. In some embodiments, the validation module 1102J may be configured to cause the processor 1102B to compare the hash value retrieved from the digital signature with the calculated hash value. If the hash values match, the validation module 1102J may stimulate the data processing module 1102H (or another suitable module) to perform operations (e.g., transmit a message including at least a portion of the received message data to another device such as a resource provider computer 1230 of FIG. 12).

In some embodiments, if the hash values match, the validation module 1102J may determine that the message is valid (e.g., unaltered). In some embodiments, the validation module 1102J may be configured to cause the processor 1102B to retrieve a public key of the access device, utilized to transmit a message to the user device 102, from the message received from a user device (or from an intervening device). The validation module 1102J may be configured to cause the processor 1102B to determine whether the public key of the access device included in the received message matches the public key of the access device stored in the encryption data 1102K that was utilized in a past transmission to the user device. If the public keys match, the validation module 1102J may be configured to cause the processor 1102B to determine that the message is valid (e.g., unaltered) and that a previously transmitted message that resulted in the received message was validated by a user device (e.g., user device 102) utilizing the correct public key (e.g., the public key stored in the encryption data 1102K that was associated with the previously transmitted message). In some embodiments, the validation module 1102J may terminate an interaction and perform no further processing with a transmitting device if the message is determined to be invalid (e.g., altered, based at least in part on the comparison of the retrieved hash and the calculated hash), and/or the public key of the received message does not match the public key stored in encryption data 1102K and associated with a previous message transmission to the user device 102.

The above-described systems and methods for preventing relay attacks can be used in any suitable transaction or interaction process. For example, they can be used in payment processes or access transactions. These examples are described in further detail in connection with FIGS. 12 and 13 below.

FIG. 12 shows a block diagram 1200 of a transaction processing system that can use a user device 102. FIG. 12 shows a user 1206 that can operate a user device 1210 (e.g., an example of the user device 102 of FIGS. 1-10, the user device 1002 of FIG. 10, etc.). The user 1206 may use the user device 1210 to pay fora good or service at a resource provider such as a merchant. The merchant may operate a resource provider computer 1230 and/or an access device 1220 (e.g., an example of the access device 104-1 and/or access device 1102 of FIG. 1-10). The merchant may communicate with an authorizing entity computer 1260 operated by an issuer, via a transport computer 1240 operated by an acquirer and a processing network 1250 such a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions .VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a user device 1210 at an access device 1220 (e.g., POS location) can be described as follows. A user 1206 presents his user device 1210 to an access device 1220 to pay for an item or service. The user device 1210 and the access device 1220 may interact via a BLE communications protocol. In some embodiments, data (e.g., identification information, a public key, a certificate, location information, interaction data, etc.) may be exchanged between the user device 1210 and the access device 1220. Data transmitted from the access device 1220 to the user device 1210 may be digitally signed in the manner described above by the access device 1220 and verified by the user device 1210. Similarly, data transmitted from the user device 1210 may be digitally signed in the manner described above by the user device 1210 and verified by the access device 1220. If the interaction is allowed and the message data exchanged between the devices is verified as being unaltered, data related to the interaction (e.g., identification data of the access device 1220, identification data of the user device 1210, payment information, message data 502 of FIG. 5, or any suitable data) may be transmitted to the resource provider computer 1230.

The resource provider computer 1230 may receive this information from the access device 1220 via an external communication interface. The resource provider computer 1230 may then generate an authorization request message that includes the information received from the access device 1220 and electronically transmits this information to a transport computer 1240. The transport computer 1240 may then receive, process, and forward the authorization request message to a processing network 1250 for authorization.

In general, prior to the occurrence of a credit or debit-card transaction, the processing network 1250 has an established protocol with each issuer on how the issuer's transactions are to be authorized. In some cases, such as when the transaction amount is below a threshold value, the processing network 1250 may be configured to authorize the transaction based on information that it has about the user's account without generating and transmitting an authorization request message to the authorizing entity computer 1260. In other cases, such as when the transaction amount is above a threshold value, the processing network 1250 may receive the authorization request message, determine the issuer associated with the user device 1210, and forward the authorization request message for the transaction to the authorizing entity computer 1260 for verification and authorization. Once the transaction is authorized, the authorizing entity computer 960 may generate an authorization response message (that may include an authorization code indicating the transaction is approved or declined) and transmit this electronic message via its external communication interface to processing network 1250. The processing network 1250 may then forward the authorization response message to the transport computer 1240, which in turn may then transmit the electronic message to comprising the authorization indication to the resource provider computer 1230, and then to the access device 1220. The access device 1220 may provide access to the goods and/or services based at least in part on the receipt of the authorization response message (e.g., receiving an authorization response message that indicates the transaction was approved).

At the end of the day or at some other suitable time interval, a clearing and settlement process between the resource provider computer 1230, the transport computer 1240, the processing network 1250, and the authorizing entity computer 1260 may be performed on the transaction.

Figure 13:
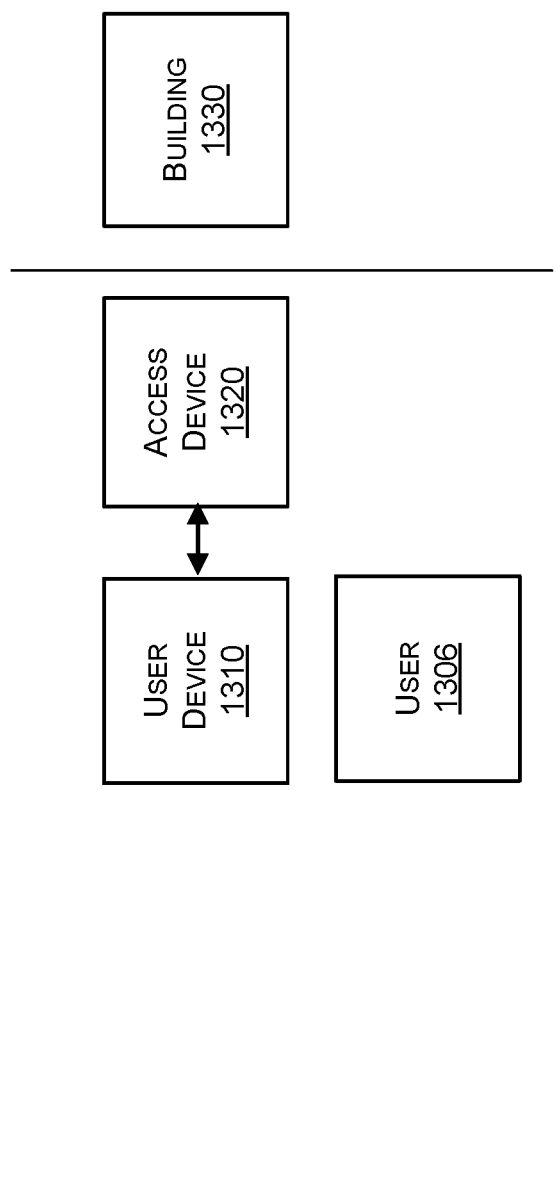
FIG. 13 shows a block diagram illustrating a building access system.

FIG. 13 shows a block diagram of a building access system. FIG. 13 shows a user device 1310 (e.g., user device 102 of FIG. 1) operated by a user 1306. The user device 1310 may be been provisioned with certificate as described above. The user device 1310 can interact with the access device 1320 (e.g., an example of the access device 104-1 of FIG. 1) and pass access data to the access device 1320. The access device 1320 may be configured to generate a public/private key. An advertisement and/or any suitable message data (e.g., an identifier of the access device 1320, a location of the access device 1320, interaction data, etc.) transmitted by the access device 1320 may be hashed and the resultant hash value signed using the private key. The access device 1320 may provide the public key and the digital signature to the user device 1310 in the same message or different message. The user device 1310 may utilize the public key provided (or a public key received from another access device in the case of relay attack) to validate the message. If the message is invalid, the user device 1310 may terminate the interaction with access device 1320. If the message is valid, the user device 1310 may utilize additional message data (e.g., a location of the access device 1320) to perform a distance check and terminate interaction if the distance of the user device 1310 is outside a threshold distance to the location of the access device 1320). If the message is valid, the user of the user device 1310 may be presented with an option to confirm interaction with the access device 1320. If confirmed, the user device 1310 may transmit a message back to the access device 1320.

In some embodiments, the message data of the message transmitted by the user device 1310 to the access device 1320 may include the certificate associated with the user device 1310, an identifier of the access device 1320, and the public key utilized to validate the originally received message. In some embodiments, the identifier of the access device 1320 and the public key may be hashed and digitally signed utilizing a private key associated with the user device 1310. Upon receipt, or at any suitable time, the access device 1320 may utilize the public key associated with a certifying authority that issued the certificate to retrieve the public key of the user device 1310 from the certificate. Utilizing the retrieved public key, the access device 1320 may validate the message utilizing the digital signature provided by the user device 1310. As part of validation, the access device 1320 may verify that its public key was utilized by the user device 1310 to validate the originally transmitted message based at least in part on determining that the public key provided in the message was unaltered (e.g., as determinable utilizing the digital signature of the message) and that the provided public key matches the public key stored by the access device 1320. If the access device 1320 determines that the message data received from the user device 1310 is valid, the access device 1320 may then proceed to let the user 1306 enter the building 1330. If, however, the access device 1320 determines that the wrong public key was used by user device 1310 for validation, or any of the message data was altered (e.g., as determinable using the digital signature), the access device 1320 may terminate interaction with user device 1310, and the user 1306 may not be given access to the building 1330.

Technical Benefits

Embodiments of the invention provide for a number of advantages. For example, by configuring the disclosed access devices to generate their own public/private keys, the system may provide enhanced validation functionality without incurring additional key maintenance overhead of a certificate authority. Utilizing the various methods disclosed herein, the user device 102 may be configured to validate interaction data from an interacting device (e.g., an access device) utilizing a digital signature and a public key. Through this validation, the user device 102 may be configured to determine when the message has been altered and may be configured to automatically reject and/or terminate interaction with an access device. These techniques may ensure that the user device 102 does not provide payment information to an intervening device. Even if one or more intervening devices were to intercept messages and relay them to the user device 102, the techniques disclosed herein enable the user to detect that data is being received from a device other than the device to which the user confirmed connection. The user may be provided the ability to cancel and/or terminate the interaction. Even when the user may not recognize the discrepancy, the user device 102 may digitally sign its interaction data (e.g., including its payment data) when transmitting data back to an access device (e.g., potentially though one or more intervening devices unknowingly). The receiving access device may then verify the data within the message utilizing the public key associated with the user device to ensure that 1) the message was unaltered, and 2) that the correct public key associated with the access device was utilized to validate the original message transmitted to the user device. In this manner, data security is enhanced but preventing relay attacks and/or man in the middle attacks that would otherwise enable a fraudster to gain access to sensitive information (e.g., payment data) for fraudulent purposes.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software. Any of the above mentioned entities may operate a computer that is programmed to perform the functions described herein.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method, comprising:
   receiving, by a user device, first access device identification data associated with a first access device, the first access device identification data comprising a first public key;
   receiving, by the user device, a message comprising message data including at least second access device identification data corresponding to a second access device and a digital signature that is created by a hash of the at least second access device identification data being digitally signed with a private key of a public/private key pair associated with the second access device;
   obtaining the hash from the digital signature using a second public key;
   generating an additional hash of the message data;
   comparing, by the user device, the hash to the additional hash;
   determining, by the user device, if the hash matches the additional hash;
   when the hash does not match the additional hash and the second public key used to obtain the hash is the first public key associated with the first access device:
      identifying that the second access device identification data differs from the first access device identification data; and
      presenting, by the user device, the second access device identification data indicating a mismatch; and
   when the hash matches the additional hash and the second public key used to obtain the hash is received in the message:
      determining that a user of the user device has not confirmed an intent to interact with the second access device; and
      terminating any further interaction with the second access device based at least in part on determining that the user has not confirmed an intent to interact with the second access device.

2. The method of claim 1, wherein the message is transmitted from the second access device to the user device via a first intervening device and a second intervening device.

3. The method of claim 1, wherein the message data further comprises an interaction value.

4. The method of claim 1, wherein the first access device and the second access device are automated fuel dispensers.

5. The method of claim 1, further comprising:
   presenting, by the user device, the first access device identification data in a request to interact with the first access device to the user of the user device; and
   receiving, by the user device, a confirmation from the user that the user wants to interact with the first access device.

6. The method of claim 1, further comprising:
   receiving, by the user device based at least in part on presenting the second access device identification data, a confirmation that the user of the user device wants to interact with the second access device.

7. The method of claim 6, further comprising:
in response to receiving the confirmation that the user of the user device wants to interact with the second access device, transmitting, by the user device to the second access device, a second message comprising second message data including the at least second access device identification data and the first public key, wherein transmitting the second message causes the second access device to terminate any further processing of the second message.

8. The method of claim 7, wherein the second access device is caused to terminate further processing of the second message based at least in part on determining that the second message data does not match the message data sent from the second access device to the user device.

9. The method of claim 1, further comprising:
presenting, by the user device, the first access device identification data in a request to interact with the first access device; and
receiving, at a user interface presented at the user device, a confirmation indicating that connection with the first access device is intended.

10. The method of claim 1, further comprising, when the hash matches the additional hash and the second public key used to obtain the hash is received in the message:
identifying that the second access device identification data is different from the first access device identification data for the first access device; and
presenting, by the user device, the second access device identification data in a second request to interact with the second access device.

11. The method of claim 1, further comprising:
determining that a first location received as part of the message data exceeds a threshold distance from a second location of the user device; and
automatically terminating any further interaction with the second access device when the first location is determined to exceeds the threshold distance from the second location of the user device.

12. A user device, comprising:
a processor; and
a computer readable medium, the computer readable medium comprising code, executable by the processor, for implementing a method comprising:
receiving, from a first intervening device, first access device identification data associated with a first access device, the first access device identification data comprising a first public key, the first access device;
receiving, by the user device, a message comprising message data including at least second access device identification data corresponding to a second access device and a digital signature that is created by a hash of the at least second access device identification data being digitally signed with a private key of a public/private key pair associated with the second access device;
obtaining the hash from the digital signature using a second public key;
generating an additional hash of the message data;
comparing the hash to the additional hash;
determining if the hash matches the additional hash;
when the hash does not match the additional hash and the second public key used to obtain the hash is the first public key associated with the first access device;
identifying that the second access device identification data differs from the first access device identification data; and
presenting, by the user device, the second access device identification data indicating a mismatch; and
when the hash matches the additional hash and the second public key used to obtain the hash is received in the message:
determining that a user of the user device has not confirmed an intent to interact with the second access device; and
terminating any further interaction with the second access device based at least in part on determining that the user has not confirmed an intent to interact with the second access device.

13. The user device of claim 12, wherein the message is transmitted from the second access device to the user device via the first intervening device and a second intervening device.

14. The user device of claim 12, wherein the message data further comprises an interaction value.

15. The user device of claim 12, wherein the first access device and the second access device are automated fuel dispensers.

16. The user device of claim 12, wherein the method further comprises:
presenting the first access device identification data in a request to interact with the first access device to the user of the user device; and
receiving a confirmation from the user that the user wants to interact with the first access device.

17. The user device of claim 12, wherein the method further comprises:
presenting the second access device identification data in a subsequent request to interact with the second access device; and
receiving based at least in part on presenting the second access device identification data, a confirmation that the user of the user device wants to interact with the second access device.

18. The user device of claim 17, wherein the method further comprises:
in response to receiving the confirmation that the user of the user device wants to interact with the second access device, transmitting, by the user device to the second access device, a second message comprising second message data including the at least second access device identification data and the first public key associated with the first access device, wherein transmitting the second message causes the second access device to terminate any further processing of the second message.

19. The user device of claim 18, wherein the second access device is caused to terminate further processing of the second message based at least in part on determining that the second message data does not match the message data sent from the second access device to the user device.

20. The user device of claim 12, wherein the method further comprises, when the hash matches the additional hash and the second public key used to obtain the hash is received in the message and associated with the second access device:
identifying that the second access device identification data is different from the first access device identification data for the first access device; and presenting, by the user device, the second access device identification data in a second request to interact with the second access device.

\* \* \* \* \*